US007826637B2

(12) United States Patent
Muratani

(10) Patent No.: US 7,826,637 B2
(45) Date of Patent: Nov. 2, 2010

(54) DIGITAL WATERMARK EMBEDDING APPARATUS, DIGITAL WATERMARK DETECTING APPARATUS, DIGITAL WATERMARK EMBEDDING METHOD, DIGITAL WATERMARK DETECTING METHOD AND COMPUTER PROGRAM PRODUCT

(75) Inventor: Hirofumi Muratani, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/336,832

(22) Filed: Jan. 23, 2006

(65) Prior Publication Data
US 2006/0120561 A1 Jun. 8, 2006

Related U.S. Application Data

(63) Continuation of application No. 09/984,669, filed on Oct. 30, 2001, now abandoned.

(30) Foreign Application Priority Data

Oct. 31, 2000 (JP) .............................. 2000-333725

(51) Int. Cl.
G06K 9/00 (2006.01)
H04L 9/32 (2006.01)
(52) U.S. Cl. ....................................... 382/100; 713/176
(58) Field of Classification Search ........................ None
See application file for complete search history.

(56) References Cited

U.S. PATENT DOCUMENTS 5,636,292 A 6/1997 Rhoads

| 5,960,081 | A  | * | 9/1999  | Vynne et al. | ................. | 713/176 |
| 6,282,300 | B1 | * | 8/2001  | Bloom et al. | ............... | 382/100 |
| 6,320,829 | B1 | * | 11/2001 | Matsumoto et al. | ...... | 369/47.12 |

OTHER PUBLICATIONS

"Enhancing Robustness of Digital Watermarking against Geometric Attack Based on Fractal Transform" by Ni et al., Multimedia and Expo, 2000. ICME 2000. 2000 IEEE International Conference, vol. 2, Jul. 30-Aug. 2, 2000 pp. 1033-1036 vol. 2.*

Petitcolas et al., "Evaluation of copyright marking systems," Proceedings of IEEE Multimedia Systems, vol. 1, pp. 574-579, Jun. 1999.*

M. Kutter, Signal Processing Laboratory Swiss Federal Institute of Technology Ecublens, 10 pages, "Watermarking Resisting to Translation, Rotation, and Scaling", 1998.

Martin Kutter, et al., Signal Processing Laboratory, EPFL, 5 pages, "Digital Signature of Color Images Using Amplitude Modulation", 1997.

Joseph J. K. Ó Ruanaidh, et al., IEEE, pp. 536-539, "Rotation, Scale and Translation Invariant Digital Image Watermarking", 1997.

(Continued)

*Primary Examiner*—Charles Kim
(74) *Attorney, Agent, or Firm*—Oblon, Spivak, McClelland, Maier & Neustadt, L.L.P.

(57) ABSTRACT

A digital watermark embedding apparatus for embedding watermark information into a digital content, obtains a predetermined topological invariant corresponding to the watermark information to be embedded into the digital content, and sets the predetermined topological invariant to the digital content by modifying the digital content into which the watermark information is to be embedded.

29 Claims, 23 Drawing Sheets

OTHER PUBLICATIONS

Joseph J. K. Ó Ruanaidh, et al., Signal Processing, vol. 66, pp. 303-317, "Rotation, Scale and Translation Invariant Spread Spectrum Digital Image Watermarking", 1998.

David J. Fleet, et al., IEEE, pp. 532-535, "Embedding Invisible Information in Color Images", 1997.

W. Bender, et al., IBM Systems Journal, vol. 35, No. 3 & 4, pp. 313-336; "Techniques for Data Hiding", 1996.

Shelby Pereira, et al., pp. 197-210, "Fast Robust Template Matching for Affine Resistant Image Watermarks", 2000.

Martin Kutter, Signal Processing Laboratory (LTS) Swiss Federal Institute of Technology, pp. 1-27, "Towards Affine Invariant Image Watermarking Schemes", 2004.

Takao Nakamura, et al., The Institute of Electronics, Information and Communication Engineers, 193-198, "An Improvement of Watermark Robustness Against Moving and/or Cropping the Area of the Image", Jan. 26-29, 1999.

* cited by examiner

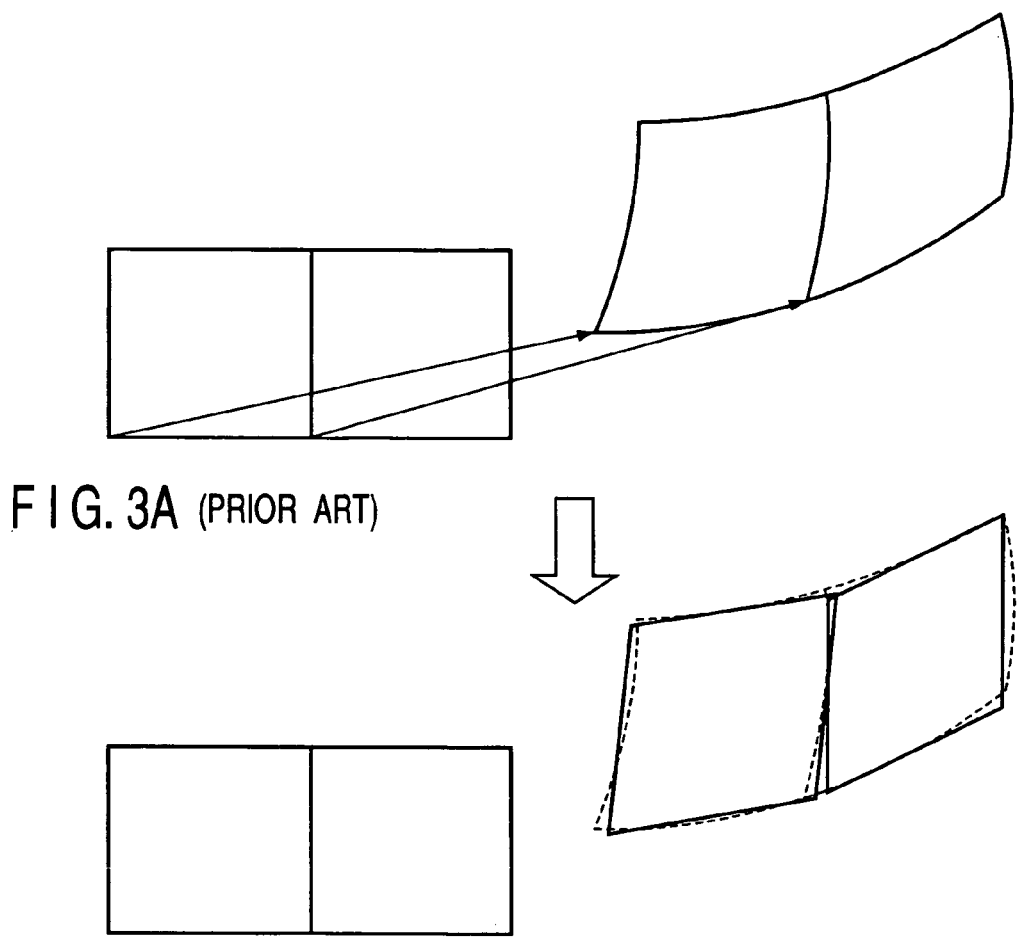
FIG. 3A (PRIOR ART)
FIG. 3B (PRIOR ART)
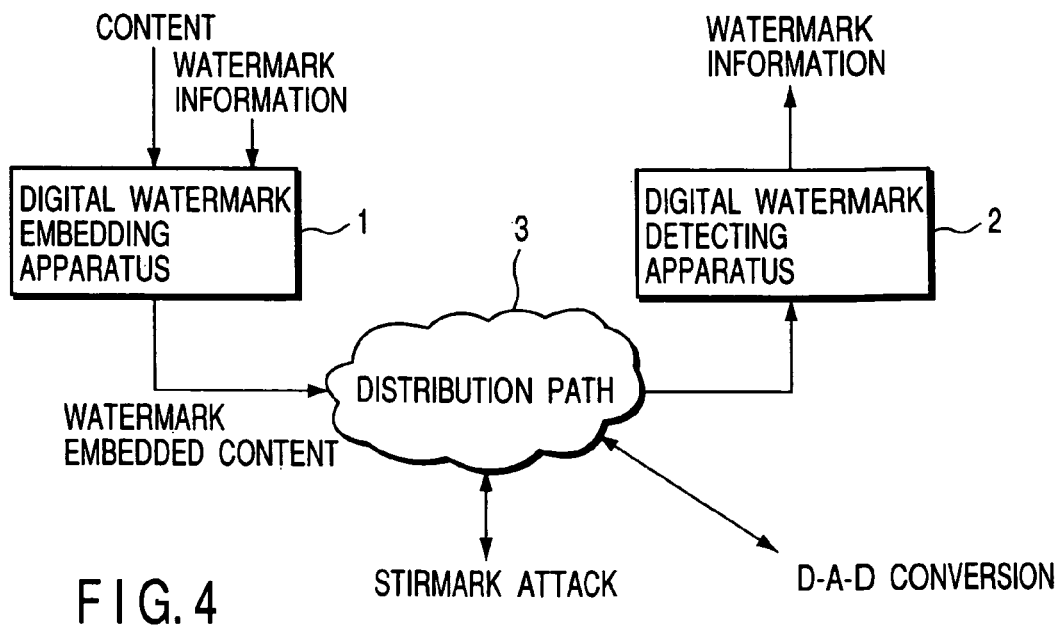
FIG. 4

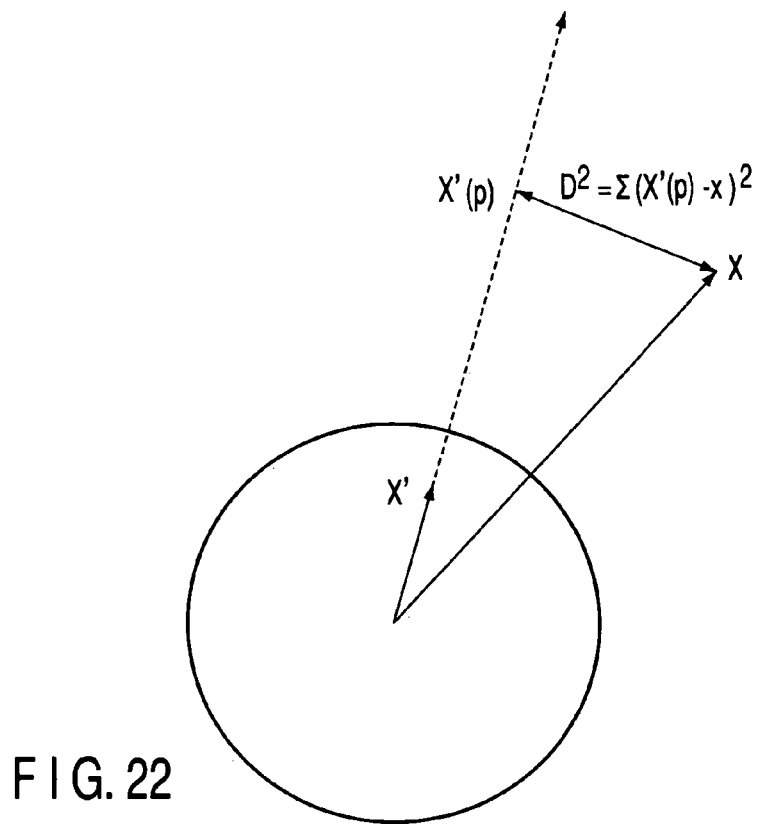
FIG. 22
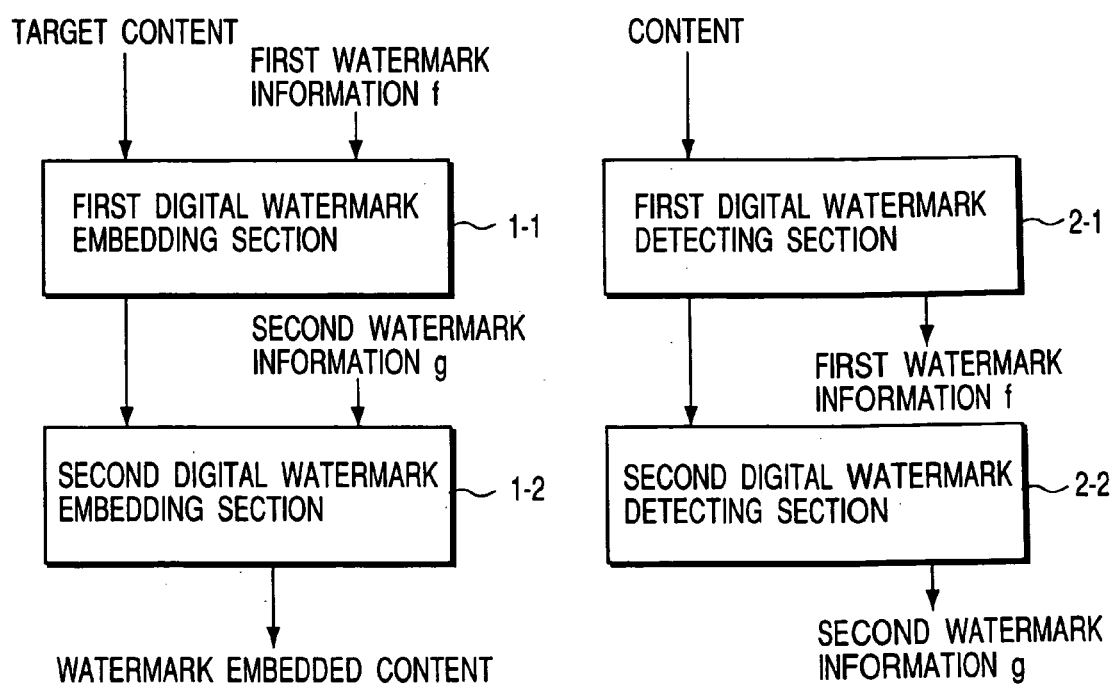
FIG. 23
FIG. 24

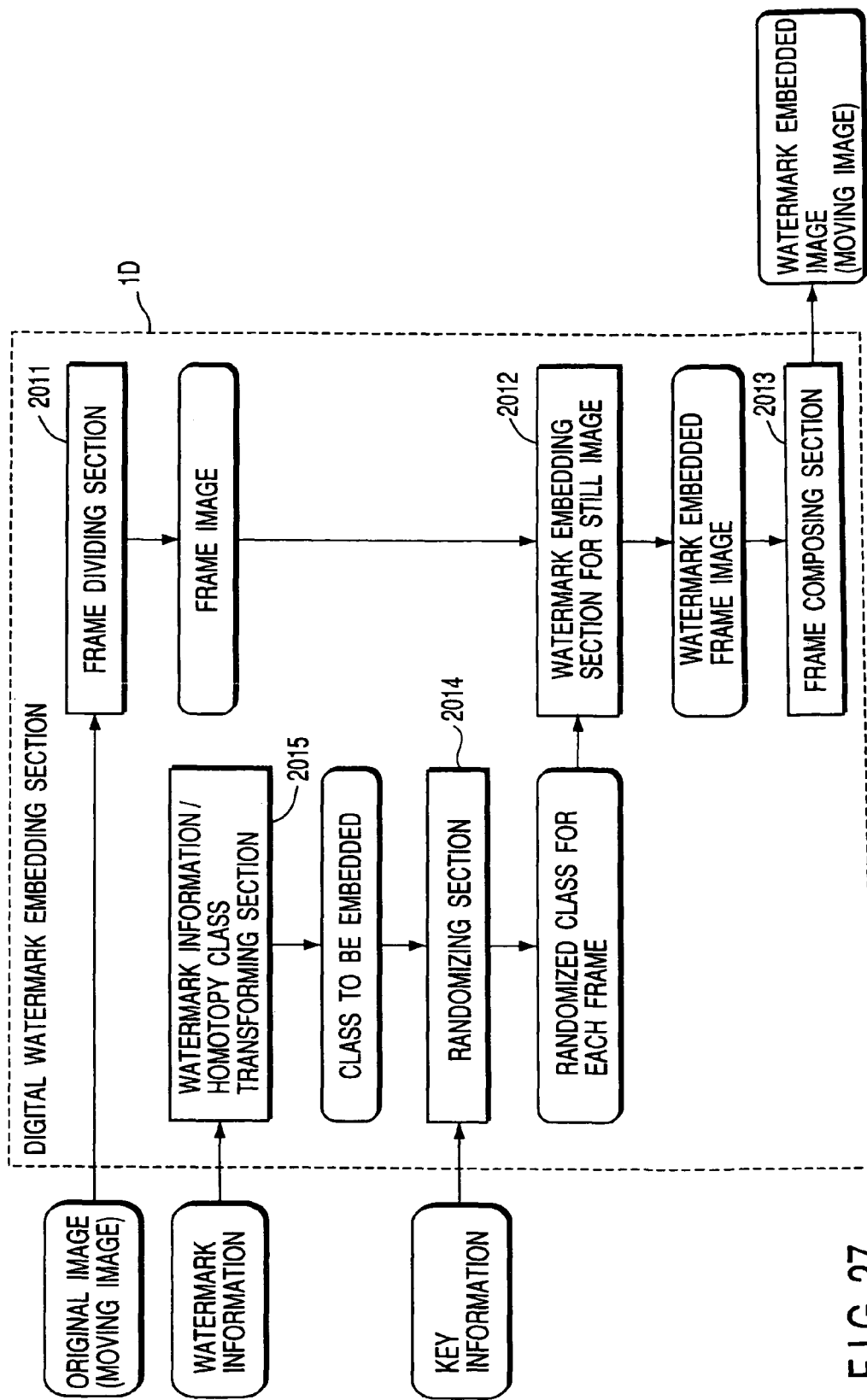
F I G. 27

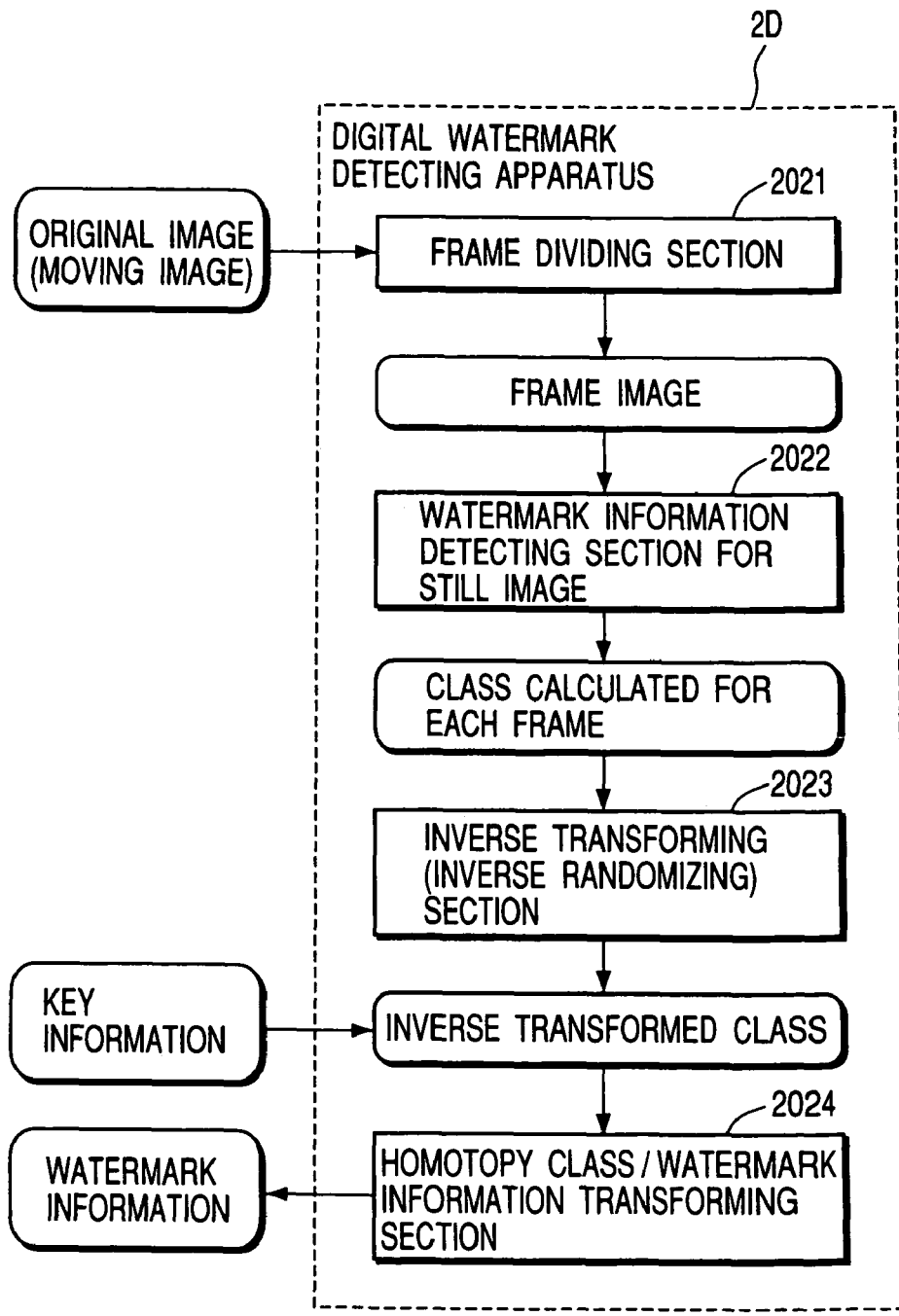
F I G. 28

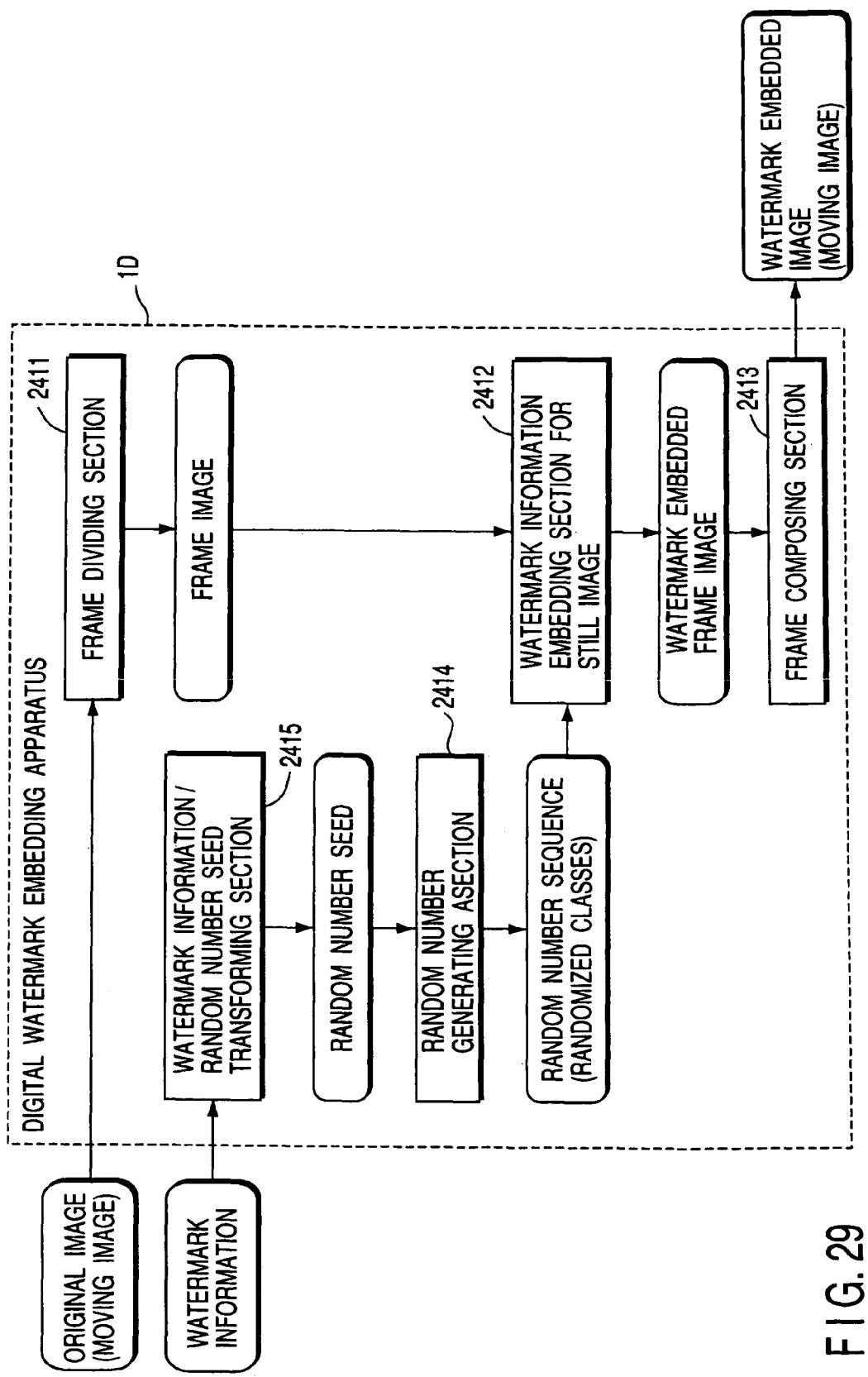
F I G. 29

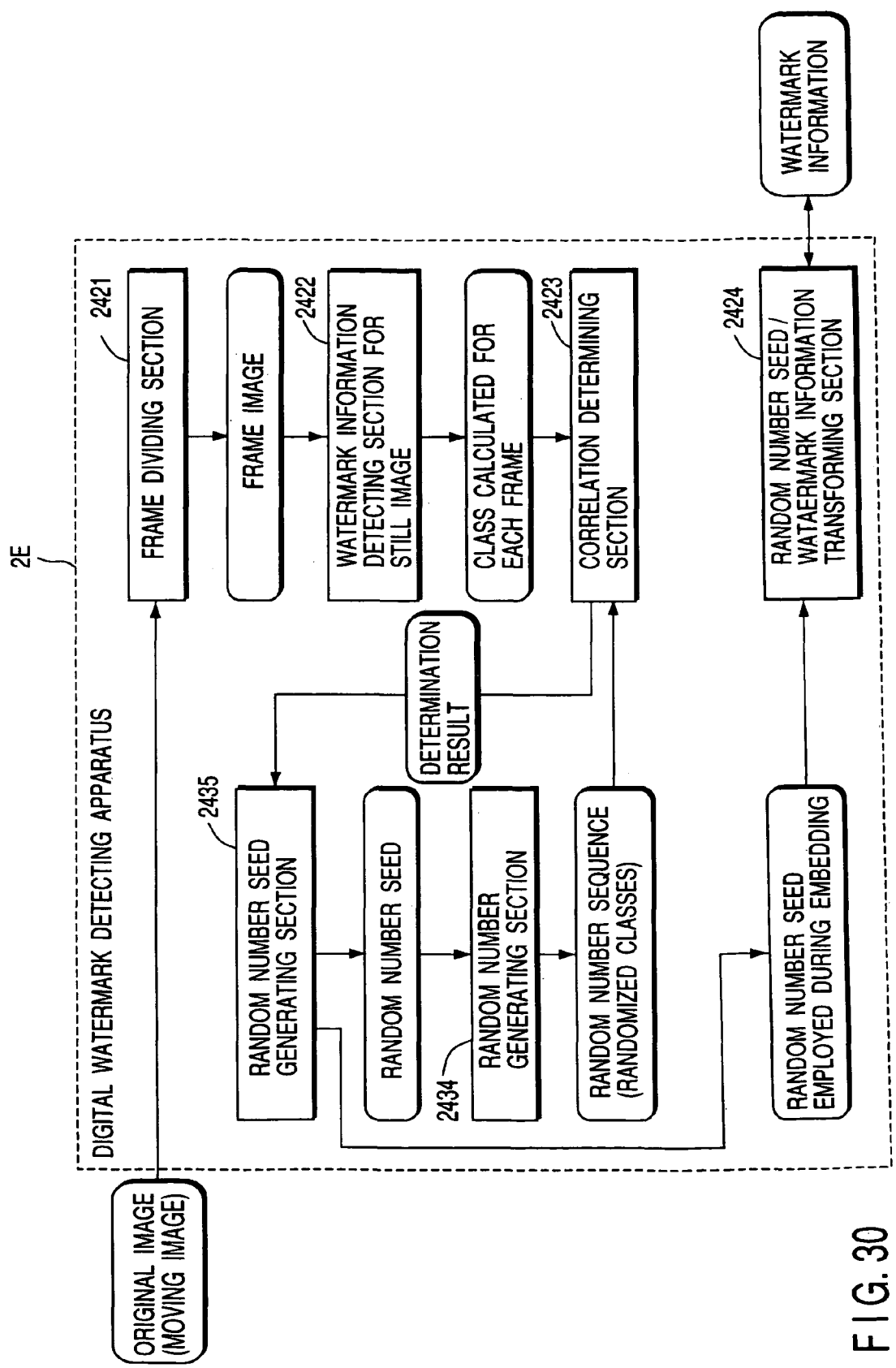
F I G. 30

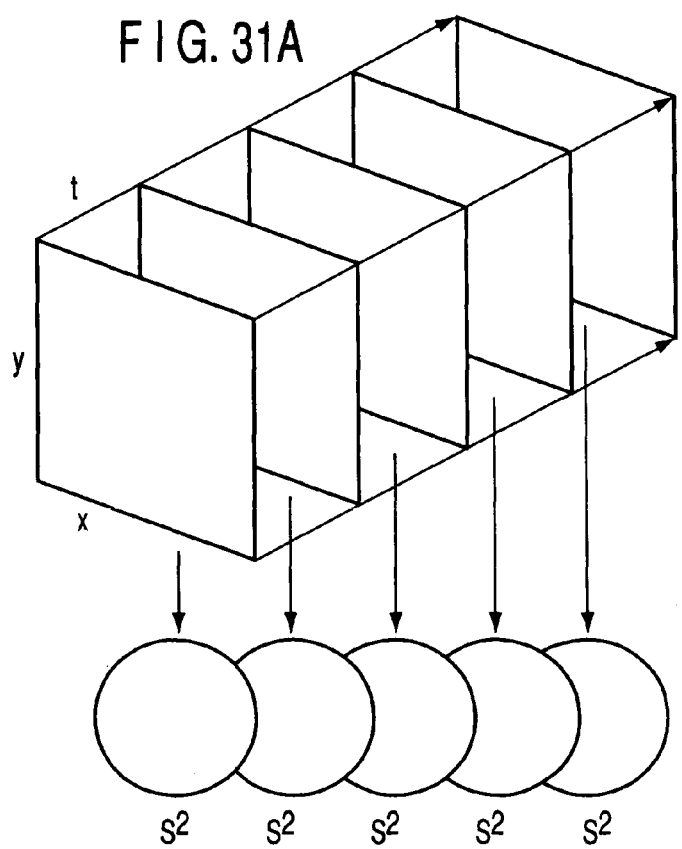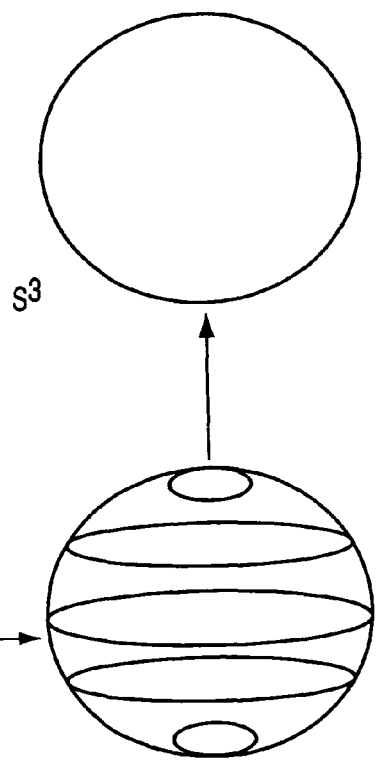
FIG. 31A
FIG. 31B
FIG. 31C
FIG. 31D

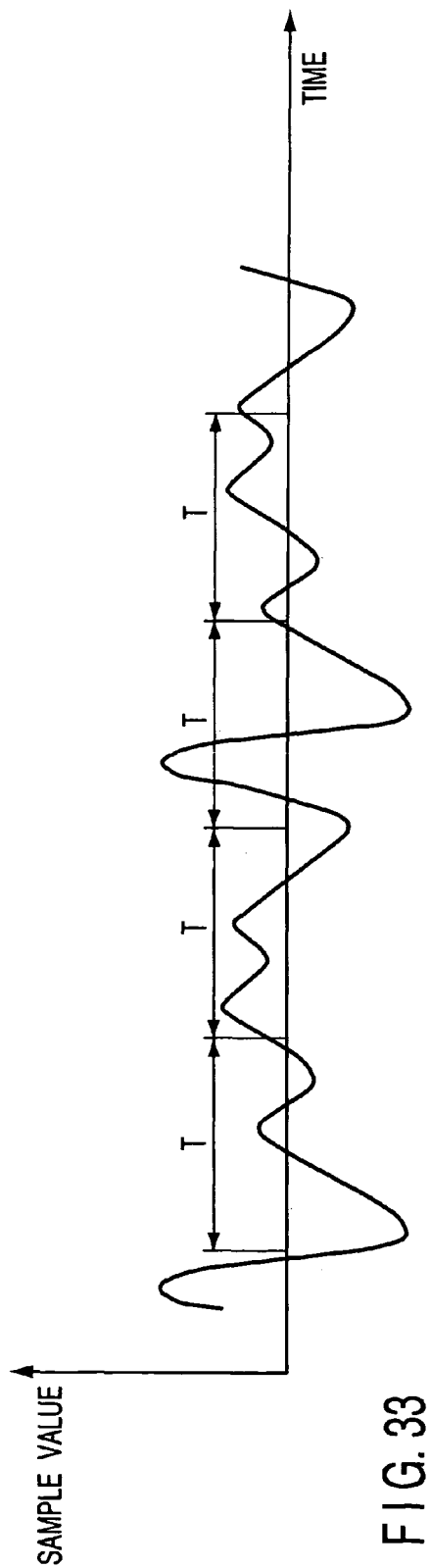
F I G. 33
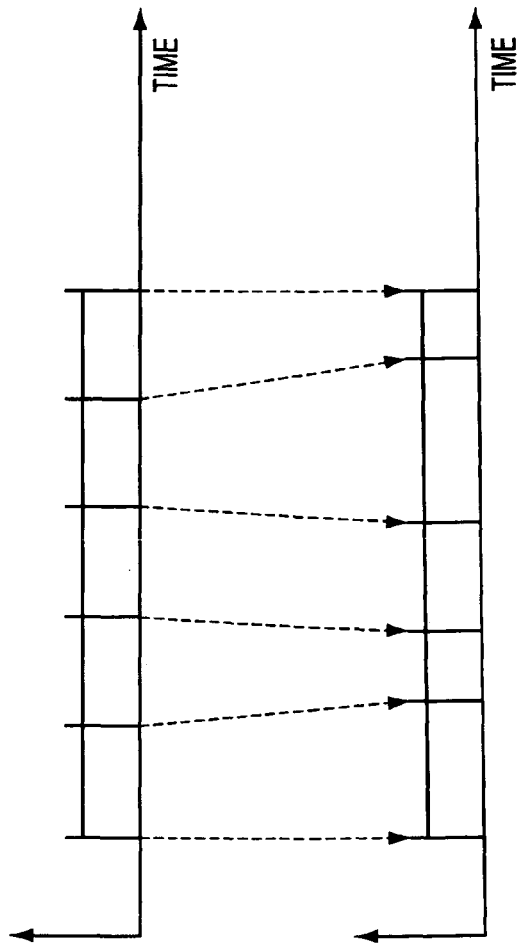
F I G. 36

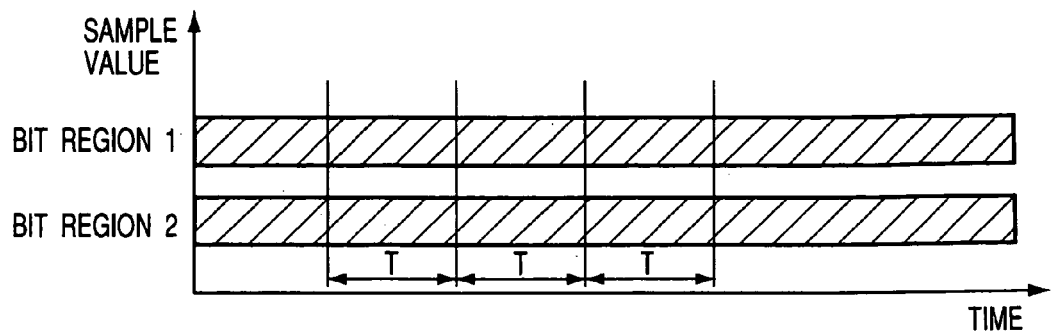
F I G. 34A
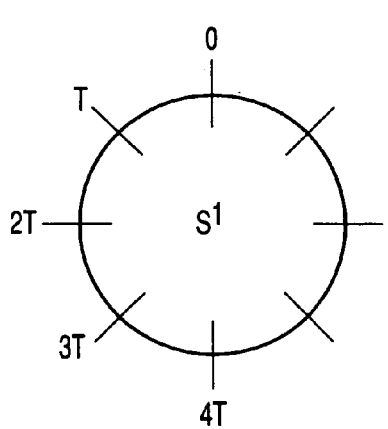 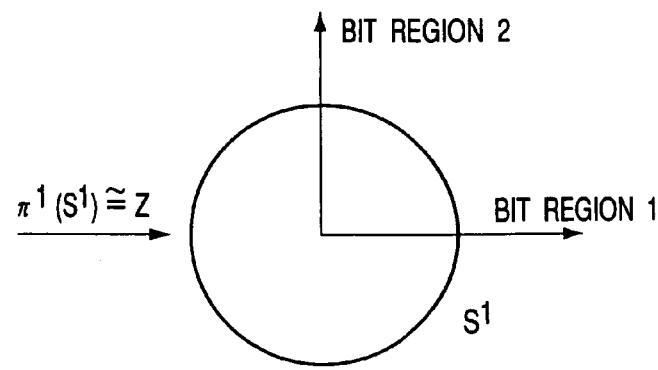
F I G. 34B      F I G. 34C

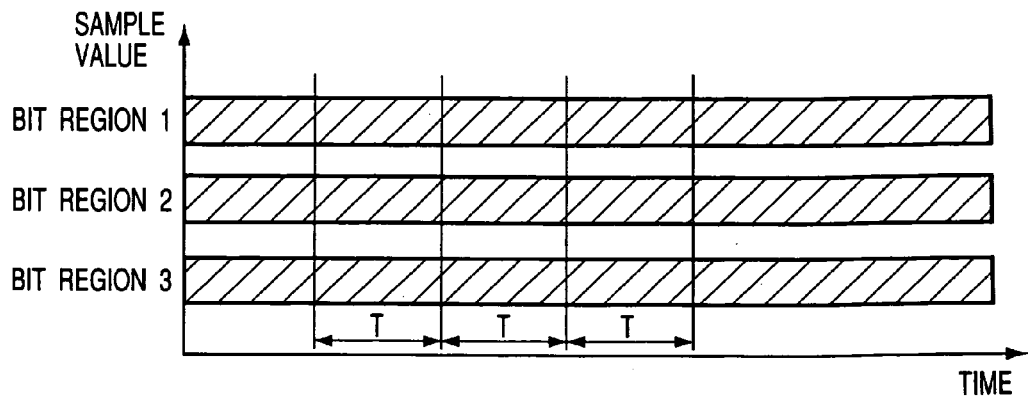
FIG. 35A
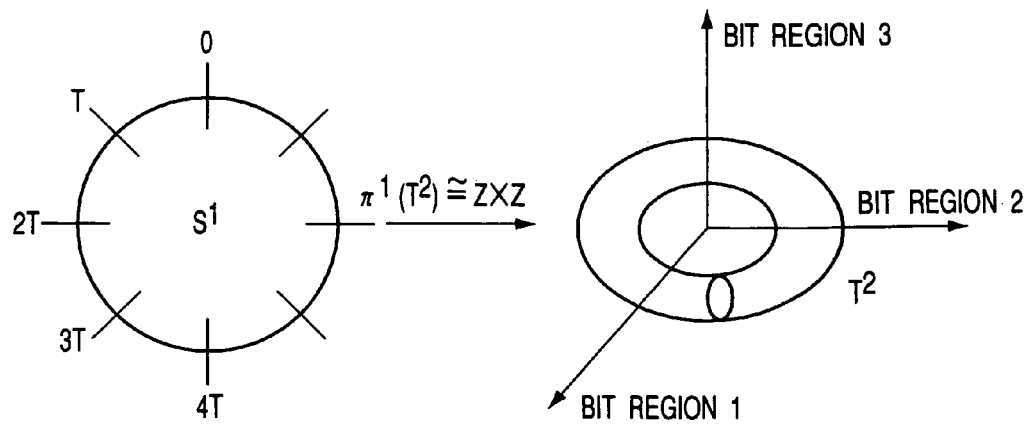
FIG. 35B
FIG. 35C

DIGITAL WATERMARK EMBEDDING APPARATUS, DIGITAL WATERMARK DETECTING APPARATUS, DIGITAL WATERMARK EMBEDDING METHOD, DIGITAL WATERMARK DETECTING METHOD AND COMPUTER PROGRAM PRODUCT

CROSS-REFERENCE TO RELATED APPLICATIONS

This application is based upon and claims the benefit of priority from the prior Japanese Patent Application No. 2000-333725, filed Oct. 31, 2000, the entire contents of which are incorporated herein by reference.

BACKGROUND OF THE INVENTION

1. Field of the Invention

The present invention relates to a digital watermark embedding apparatus and a digital watermark embedding method for embedding watermark information into a content such as digital still image data, moving image data, voice data or music data, and a digital watermark detecting apparatus and a digital watermark detecting method for detecting watermark information from a content.

2. Description of the Related Art

Digital watermarking is a technique for embedding information such as discrimination information on the copyright owner or user of a content such as a digital still image, moving image, voice or music, ownership information on the copyright owner, content using conditions, secret information necessary to use the content and/or copy control information (which information is referred to as watermark information) into the content so as to make it difficult to recognize the information, detecting the information later at need from the content, thereby protecting the copyright of the content including the controlling the use of the content and the controlling the copying of the content and promoting the secondary use of the content.

If the digital watermarking is intended to prevent the illegal use of a digital book, it is necessary for the digital watermarking to have robustness for preventing watermark information from being lost or falsified by various operations or intentional attacks normally considered to be applied to the digital book. Depending on a digital watermarking applied field, even if a content which has been converted into an analog signal is digitalized again, it is desirable not to lose the watermark information. This is exemplified by embedding, as watermark information, copy control information into a content. As another example, if ownership information is embedded into a still image and the still image is printed out (or sometimes copied) and digitalized by a scanner (D-A-D conversion), then it is desirable not to lose the watermark information.

D-A-D conversion is considered to cause a geometrical distortion to an image as shown in FIG. 1. As a software simulating and recreating such a geometrical distortion, there is known StirMark. A StirMark attack employing this simulation software for image data into which digital watermark information is embedded changes the positions of pixels. Therefore, depending on a digital watermarking system or type, the positions of pixels into which the watermark information is embedded cannot be disadvantageously, accurately recognized during the detection thereof and the watermark information cannot be disadvantageously, accurately read.

In case of digital watermarking in a frequency region, frequency components do not greatly change as long as a geometrical distortion to an image is small and robustness against the StirMark attack is considered to be relatively high. However, as indicated by the change of a dotted line to a solid line shown in FIG. 2, if a geometrical distortion is large or the position of a block into which watermark information is embedded is greatly moved because an image is large in size despite a small distortion, it is difficult to ensure accurate detection.

On the other hand, in case of digital watermarking in a space region, the multiplication of pseudo-random numbers and the superimposition of mask patterns are performed for each pixel. Therefore, if the positions of pixels are moved by a StirMark attack, it is necessary to strictly synchronize the pixel positions (those during embedding with those during detection) by some method; otherwise, it is difficult to ensure accurate detection.

The geometrical distortion is roughly divided into two distortions, a global distortion and a local distortion.

Here, the global distortion means a distortion expressed by parameters independent of positions and the local distortion means a distortion expressed by the parameters which are locally different. The local distortion does not mean that a distortion is limited to a local region. Namely, a global distortion corresponds to a special case of the local distortion.

The global distortion is the scaling, rotation and translation of an entire image and can be expressed by an Affine transformation. The Affine transformation is expressed using six parameters as shown in the next formula:

$$\begin{pmatrix} x' \\ y' \end{pmatrix} = \begin{pmatrix} a_{11} & a_{12} \\ a_{21} & a_{22} \end{pmatrix} \begin{pmatrix} x \\ y \end{pmatrix} + \begin{pmatrix} b_1 \\ b_2 \end{pmatrix} \quad (1)$$

On the other hand, the local distortion is ordinary two-dimensional coordinate transformation as shown in the following formula, where f and g are arbitrary functions:

$$\begin{pmatrix} x' \\ y' \end{pmatrix} = \begin{pmatrix} f(x, y) \\ g(x, y) \end{pmatrix} \quad (2)$$

FIG. 3A shows that a rectangle is locally distorted and FIG. 3B shows a local distortion to the rectangle is approximated to an affine transformation for each patch.

Conventionally, some methods for synchronizing pixel positions for a global distortion employs an original image and others do not employ the original image. If an original image is employed, a global transformation is manually performed so as to coincide a detection target image with the original image or a transformation having a highest correlation value is searched by the correlation of pixel values between the images.

There have been proposed many synchronization methods for the digital watermarking system while an original image is not used during detection. It is, therefore, necessary to restore the synchronization of the original image with the detection target image without using the original image. Such synchronization methods are roughly divided into the following three methods (see, for example, Document (1) Kutter Martin, "Towards Affine Invariant Image Watermarking Schemes," Watermarking Workshop, 1999.)

(1) Template Based Watermarking

A method for embedding a signal (template) for recognizing an image distortion in a frequency region or a space region is referred to as "template watermarking" (see, for example, Document (2) Bender, W., D. Gruhl, N. Morimoto and A. Lu, "Techniques for data hiding," IBM Systems Journal, 35, 3&4, 313-336, 1996. Document (3) Fleet, David J. and David J. Heeger, "Embedding Invisible Information in Color Images," ICCP'97, 532-535, 1997. Document (4) Rhoads, Geoffrey B. "Steganography methods employing embedded calibration data," U.S. Pat. No. 5,636,292, 1997. Document (5) Pereira, Shelby and Thierry Pun, "Fast Robust Template Matching for Affine Resistant Image Watermarking," The Third Workshop on Information Hiding, 207-218, 1999). The disadvantage of this method is that it is difficult to maintain robustness while suppressing image degradation caused by the template.

(2) Invariant Watermarking

A method for embedding digital watermark information into a region invariant to a geometrical distortion is referred to as "invariant watermarking" (see, for example, Document (6) Ó Ruanaidh, Joseph J. K. and Thierry Pun, "Rotation, scale and transformation invariant digital image watermarking," Proceedings of ICIP'97, 536-539, 1997. Document (7) Ó Ruanaidh, Joseph J. K. and Thierry Pun, "Rotation, scale and transformation invariant spread spectrum digital image watermarking," Signal Processing, 66, 303-317, 1998.). This method is effective only to a uniform scale transformation and rotation and not invariant to a transformation for transforming an aspect ratio.

(3) Self-Reference Watermarking

A method for employing digital watermark information itself as a template is referred to as "self-reference watermarking" (see, for example, Document (8) Kutter, M., F. Jordan and F. Bossen, "Digital signature of color images using amplitude modulation," Proc. of SPIE storage and retrieval for image and video database, 3022-5, 518-526, February 1997; Journal of Electronic Imaging, 7, 2, 326-332, April 1998). According to this method, a reference point is defined in an image, digital watermark information having a preset value is embedded into the reference point, and the reference point is obtained by full retrieval and then other watermark information is extracted during detection. With this method, if only rotation, translation or scaling is performed, detection can be completed in a relatively short time. However, if a retrieval space becomes wide, calculation cost is excessively pushed up. It is, therefore, difficult to apply this method to a local distortion requiring a wider retrieval space.

As a development of this self-reference watermarking method, there is known a method for embedding the same watermark information into horizontally shifted positions and vertically shifted positions a plurality of times and employing the watermark information as a correction signal (see, for example, Document (9) Kutter, M, "Watermarking resisting to translation, rotation, and scaling," Proceeding of SPIE International Symposium on Voice, Video, and Data Communications, 1998).

Further, there is known another self-reference watermarking method for limiting a geometrical distortion to translation and cut, obtaining a translation quantity from the phase of a Fourier transform coefficient for a digital watermark pattern to thereby reduce retrieval cost (see, for example, Document (10) Takao Nakamura, Hiroshi Ogawa, Atsuki Tomioka and Yohichi Takashima, "A scheme for improving digital watermarking translation and cut resistance," SCIS'99, 193-198, 1999.).

Additionally, there is known yet another self-reference watermarking method for dividing an image into small blocks and approximating an image distortion to a block translation (see, for example, Document (1)).

The above-stated three improved methods relate to a global distortion. If applied to a local distortion, retrieval cost is disadvantageously pushed up and these improvements are not effective to the local distortion.

As stated above, according to the conventional watermarking, watermark information is lost or falsified by a geometrical distortion such as D-A-D conversion or StirMark attack, with the result that the embedded watermark information such as copy control information and/or ownership information may not be possibly able to be detected. As for robustness against a global distortion out of a geometrical distortion, there have been conventionally proposed some techniques. However, these techniques are not effective for a local distortion such as a StirMark attack or D-A-D conversion.

Further, if measures against a global distortion are forced to be applied to a local distortion, it is feared that considerably long processing time is required.

Besides, if a local distortion becomes large, the measures against the global distortion becomes ineffective.

BRIEF SUMMARY OF THE INVENTION

It is an object of the present invention to provide a digital watermark embedding apparatus, a digital watermark detecting apparatus, a digital watermark embedding method and a digital watermark detecting method having robustness against a local distortion such as a StirMark attack and D-A-D conversion.

According to one embodiment of the present invention, there is provided a digital watermark embedding apparatus for embedding watermark information into a digital content, comprising:

a unit configured to obtain a predetermined topological invariant corresponding to the watermark information to be embedded into the digital content; and a setting unit configured to set the predetermined topological invariant to the digital content by modifying the digital content into which the watermark information is to be embedded.

According to another embodiment of the present invention, there is provided a digital watermark detecting apparatus for detecting watermark information from a digital content, comprising:

a detector configured to detect a predetermined topological invariant set to the digital content based a content into which the watermark information is embedded; and an output unit configured to output watermark information corresponding to the detected predetermined topological invariant.

BRIEF DESCRIPTION OF THE SEVERAL VIEWS OF THE DRAWING

FIGS. 3A and 3B shows manners in which a local distortion is approximated to an affine transformation for each patch;

FIG. 4 is a schematic block diagram of a content distribution system including a digital watermark embedding apparatus and a digital watermark detecting apparatus according to one aspect of the present invention;

FIG. 22 is an explanatory view for the optimization of a distortion to a target content in the second embodiment;

FIG. 23 shows a digital watermark embedding apparatus according to a third embodiment of the present invention;

FIG. 24 shows a digital watermark detecting apparatus according to the third embodiment;

FIG. 27 shows a digital watermark embedding apparatus according to a fifth embodiment of the present invention;

FIG. 28 shows a digital watermark detecting apparatus according to the fifth embodiment;

FIG. 29 shows a digital watermark embedding apparatus according to a sixth embodiment of the present invention;

FIG. 30 shows a digital watermark detecting apparatus according to the sixth embodiment;

FIGS. 31A, 31B, 31C and 31D are explanatory views for another moving image processing method;

FIG. 33 is an explanatory view for another voice processing method;

FIGS. 34A, 34B and 34C are explanatory views for yet another voice processing method;

FIGS. 35A, 35B and 35C are explanatory views for still another voice processing method; and FIG. 36 is an explanatory view for a still further voice processing method.

DETAILED DESCRIPTION OF THE INVENTION

Figure 1:
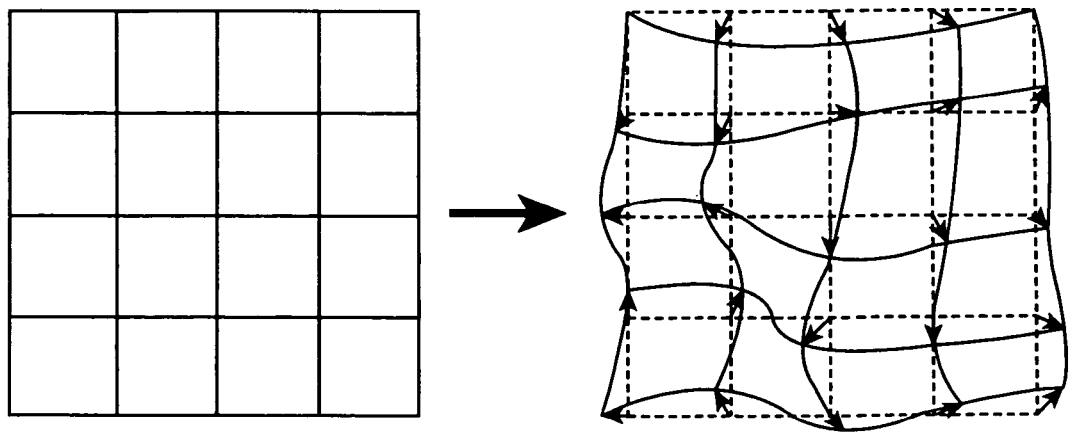
FIG. 1 shows a manner in which the geometrical distortion is made to an image by a StirMark attack.
Figure 2:
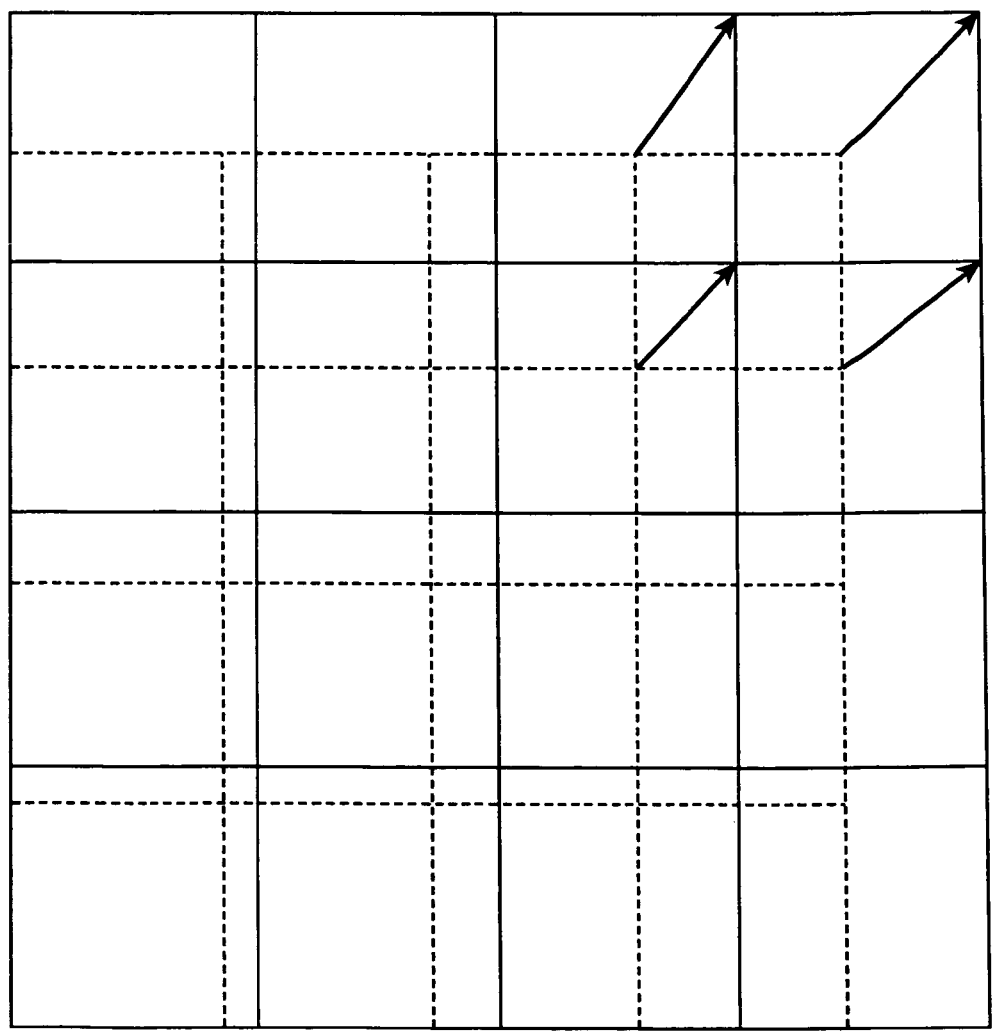
FIG. 2 shows a manner in which pixels in peripheral blocks are largely displaced by scaling.

An embodiment of the present invention will now be described with reference to the accompanying drawings.

The present invention is applicable to a case of embedding and detecting various watermark information (e.g., discrimination information on the copyright owner or user of the content, ownership information on the copyright owner, content use conditions, secret information necessary to use the content, copy control information, etc. as well as combinations thereof) into and from the content (e.g., a digital still image, moving image, voice or music) for various purposes (e.g., for controlling the use of the content, copyright protection including copy controlling or the promotion of secondary use).

FIG. 4 is a system conceptual view to which a digital watermark embedding apparatus and a digital watermark detecting apparatus according to one aspect of the present invention.

A digital watermark embedding apparatus 1 embeds watermark information into a content (embedding target content). The apparatus 1 inputs a target content and watermark information to be embedded into the target content and outputs the digital watermark information embedded content. The digital watermark embedding apparatus 1 is normally provided and managed on a content provider side. However, it is also possible for a distributor to embed a digital watermark into the target content in a distribution phase.

The digital watermark embedded content obtained by the digital watermark embedding apparatus 1 is distributed through a distribution path 3 using, as a medium, a storage medium or a communication medium. At this moment, on the distribution path 3, a locally geometrical distortion such as a StirMark attack or D-A-D conversion may be added to the content (note that the local distortion is made with or without a user's intention or recognition).

A digital watermark detecting apparatus 2 detects watermark information from the digital watermark information embedded content (detection target content). The digital watermark detecting apparatus 2 inputs the detection target content and outputs the detected watermark information. The digital watermark detecting apparatus 2 is sometimes built in a user-side content employing apparatus for the purpose of protecting the copyright of the content at the time of using the content or provided on a content provider side so that the content provider can detect a digital watermark from the distributed content.

As will be described later in detail, the digital watermark embedding apparatus 1 embeds the watermark information so that the content of the watermark information can be maintained and stored even if a StirMark attack or D-A-D conversion is applied to the content. Therefore, even if the StirMark attack or D-A-D conversion is applied to the content on the distribution path 3, the digital watermark detecting apparatus 2 is capable of accurately detecting the watermark information embedded by the digital watermark embedding apparatus 1.

It is noted that description will be given while assuming that a digital content is input into the digital watermark embedding apparatus 1 and that the digital content is output from the digital watermark detecting apparatus 2. It is also possible to provide the digital watermark embedding apparatus 1 having a function of converting an input analog content into a digital content before the watermark information is embedded into the content, and mounted thereon or to provide the digital watermark detecting apparatus 2 having a function of converting an input analog content into a digital content before the embedded watermark information is detected, mounted thereon.

The digital watermark embedding apparatus 1 can be realized as a software (program) or a hardware. Likewise, the digital watermark detecting apparatus 2 can be realized as a software (program) or a hardware.

If the content provider employs the digital watermark embedding apparatus 1 and the digital watermark detecting apparatus 2, the apparatuses 1 and 2 can be realized as an integrated unit.

If the digital watermark detecting apparatus 2 is built in the user-side content using apparatus, it is desirable to safely build the digital watermark detecting apparatus 2 in the user-side apparatus so as to prevent the user from performing an operation, an analysis or an attack to the digital watermark detecting apparatus 2.

The block diagram shown below functions as both an apparatus functional block diagram and a software (program) functional module diagram or procedure diagram.

Description will be given to a case where still image data is mainly used as a digital content by way of example. Needless to say, other media data can be used as a digital content. It is noted that a local distortion such as a StirMark attack or D-A-D conversion is a geometrical distortion to still image data if the target digital content is a still image and is a distortion to voice data in a time axis direction if the target digital content is a voice. Also, if a moving image is processed in units of frames, a local distortion is a geometrical distortion to the data as in the case of the still image. If the moving image is processed in light of time-basis positions over a plurality of frames, a local distortion is a geometrical distortion and a time-axis direction distortion (time space distortion) to the data.

Meanwhile, according to one aspect of the present invention, a topological invariant is embedded, as watermark information, into a content (for example, the pixel value or the like of a target content is changed so that the topological invariant of by the target content corresponds to the watermark information), thereby providing a robustness against a local distortion such as a StirMark attack or D-A-D conversion. Description will be given to an example of a configuration wherein a homotopy invariant is employed as an example of the topological invariant. The concepts of a topological invariant, a homotopy invariant, a homotopy set, a homotopy class will be described.

Mathematical Preparations:

First, mathematical concepts related to the present invention will be described.

If a certain set S is a topological space, it means that the set S can provide a group U of subsets satisfying the following three conditions:

(1) An empty set and the set S are included in the group U.

(2) Common parts of the elements of the group U are also the elements of group U.

(3) A sum-set of an arbitrary number of elements in the group U are the elements of the group U.

The elements of the group U are referred to as an open set and the group U is referred to as a topology on the set S.

In a topological space X, if a set U(x) of subsets of X are neighborhood systems of a point x which is each point in the topological space X, the following four conditions are established:

(1) If U∈U(x), x∈U.

(2) If U1, U2∈U(x), U1∩U2∈U(x).

(3) If U∈U(x) and U⊂V, V∈U(x).

(4) W∈U(x) satisfying U∈U(y)' for all y∈W exists for U∈U(x).

A subset U which belongs to U(x) is referred to as a neighborhood of x.

If a topological space X is a domain and a mapping f the range of which is included in a topological space Y is continuous at a point a in X, it means that V ⊃ f(U) is established by appropriately selecting a certain neighborhood U of the point a for an arbitrary neighborhood of f(a).

If the mapping f is continuous at each point in the topological space X, the mapping f is said to be continuous in the topological space X or referred to as a continuous mapping.

If a continuous mapping between two topological spaces is a bijective mapping and the inverse mapping thereof is also continuous, then this mapping is referred to as a homeomorphism. If a homeomorphism exists between two topological spaces, these spaces are said to be homeomorphic.

A property common to the spaces homeomorphic to each other is referred to as a topological property and the quantity of the property is called a topological invariant.

Closed intervals [0, 1] are expressed by I. Two topological spaces are expressed by X and Y and $f_0$ and $f_1$ are continuous mappings of X→Y. At this time, if the mapping $f_0$ is homotopic to the mapping $f_1$, it means that a continuous mapping F: X×I→Y exists and that $F(x, 0)=f_0(x)$ and $F(x, 1)=f_1(x)$ are established for all x∈X. The following formula expresses that $f_0$ is homotopic to $f_1$:

$$f_0 \cong f_1$$

Also, the mapping F is referred to as homotopy from $f_0$ to $f_1$.

A quantity having an equal value for two arbitrary homotopic mappings is referred to as a homotopy invariant. A homotopic relation is an equivalence relation on the entire continuous mapping of X to Y. [f] having a homotopic relation in the mapping f of X→Y are referred as a homotopy class of f. It is noted that $\pi_n(S^n)$ to be used later is homotypic to all integers. In this case, therefore, the homotopy class has an integer value (positive integer, 0 or negative integer). The overall homotopy classes of the mapping of X to Y is referred to as a homotopy set. In this case, the homotopy set is expressed by π(X; Y).

A mapping f*: π(Y; Z)→n(X; Z) can be defined by f*[g]= [g·f] for a composition g·f of the mapping f from X to Y and a mapping g from Y to Z. Also, the following relation is established:

$$\text{If } f \cong f', f^* \cong f'^*$$

A point in a topological space is set and this point is referred to as a base point. A continuous mapping only applies to a case of mapping one base point to another base point.

$I_n$ is assumed as an n-order cube. The boundary thereof is assumed as $\partial I_n$. With respect to the topological space X and a base point * in the topological space X, a set of mappings in which $\partial I_n$ is mapped to the base point * among mappings from $I_n$ to X is assumed as $\Omega_n(X, *)$. The entirety of arcwise connected components in the set $\Omega_n(X, *)$ (a path (a parameterized curve) with one point as a start point and the other point as an end point exists for arbitrary two points of the arcwise connected components) (homotopy class) [f] is expressed by $\pi_n(X, *)$. It is noted that the entirety of the homotopy class is simply expressed by $\pi_n(X)$ if the homotopy class is independent of the setting of the base point.

$\pi_n(X, *)$ forms a group which group is referred to as a homotopy group with * set as a base point.

Alternatively, the above-stated homotopy group is defined by an n-order spherical surface and one point on the spherical surface instead of I and $\partial I_n$. If X is an n-order spherical surface $S^n$, for example, $\pi_n(S^n)=\infty$ is established as the n-order homotopy group. Here, $\infty$ expresses a cyclic group of an infinite order.

If mappings f: X→X' and g: X'→X exist between the two topological spaces X and X' and compositions g·f and f·g are homotopic to equivalent mappings, respectively, then X and X' are said to be homotopy equivalent.

If a certain quantity corresponds to the topological space X and the same quantity corresponds to topological paces which are homotopy equivalent, then this quantity is referred to as a homotopy type invariant. The homotopy type invariant is a topological invariant. Please note that the homotopy invariant is a quantity corresponding to the mapping and the homotopy type invariant is a quantity corresponding to the topological space.

A homotopy set from a topological space X to a topological space Y is homotopy type invariants for the topological space X. If f is a mapping from X to X and homotopic to an equivalent mapping, in particular, then a mapping f* induced from the mapping f is an equivalent mapping in the homotopy set and the homotopy class is invariant by using the mapping f.

Mathematical Fact:

The present invention utilizes this mathematical fact for digital watermarking. That is, two topological spaces are assumed as X and Y and a mapping between X and Y is assumed as g. A mapping from X to X is assumed as f and f is assumed to be homotopic to an equivalent mapping. If so, a mapping between homotopy sets induced by the mapping f is an equivalent mapping. Accordingly, a homotopy class has no change.

According to the present invention, the above-stated mathematical concepts are associated with an actual target as follows.

For example, if a still image as a digital content is a target into and from which watermark information is embedded and detected, the single image comprises a group of a plurality of pixels. Since a moving image comprises a plurality of images (=a group of a plurality of pixels), the moving image is also a group of a plurality of pixels.

Although an image is constituted only out of summing finite pixels, the image is idealized and regarded as a topological space herein.

An image has always ends. In case of a still image, for example, the still image is normally a two-dimensional rectangular region and the still image has, therefore, boundaries of four edges, an upper edge, a lower edge, a left edge and a right edge. Many methods may be considered to handle the ends. For brevity, these boundary points are regarded as an identical point in this embodiment. Therefore, a still image is a topological space homeomorphic to a two-dimensional spherical surface $S^2$.

Each of the pixels constituting a still image has a space for expressing the color of the pixel. The space is, for example, a subspace having coordinates of brightness and chrominance in a three-dimensional space. While both the brightness and the chrominance have discrete values, this color space is also idealized as a topological space herein.

By associating the mathematical concepts to an actual target, one image which becomes a target into and from which watermark information is embedded and detected can be regarded as a mapping from a topological space X constituted of a set of pixels to a topological space Y which is a subspace in a color space.

Since the topological space X is, in particular, homeomorphic to the two-dimensional spherical surface, the image can be regarded as a mapping from the two-dimensional spherical surface to a topological space Y. The homotopy set of such mappings forms a homotopy group $\pi_2(Y)$.

A geometrical distortion to an image is regarded as a mapping from a topological space X to a topological space X'. Further, since the topological space X' is also homeomorphic to a two-dimensional spherical surface, the geometrical distortion can be regarded as a mapping from a two-dimensional spherical surface to a two-dimensional spherical surface.

Empirical Facts:

The empirical facts assumed in the present invention are as follows. A geometrical distortion including a global distortion such as scaling, rotation or translation and a local distortion such as a StirMark attack with respect to an image is regarded as a mapping homotopic to an equivalent mapping. Providing that a geometrical distortion which is not homotopic to an equivalent mapping is added, an image is greatly influenced by the geometrical distortion and the economic value of the image is lowered. For that reason, such a geometrical distortion is not often added. Accordingly, if the above-stated empirical fact is assumed, it is expected that such a geometrical distortion (mapping homotopic to an equivalent mapping) holds the homotopy class more invariant than because of the mathematical fact described previously.

Figure 5:
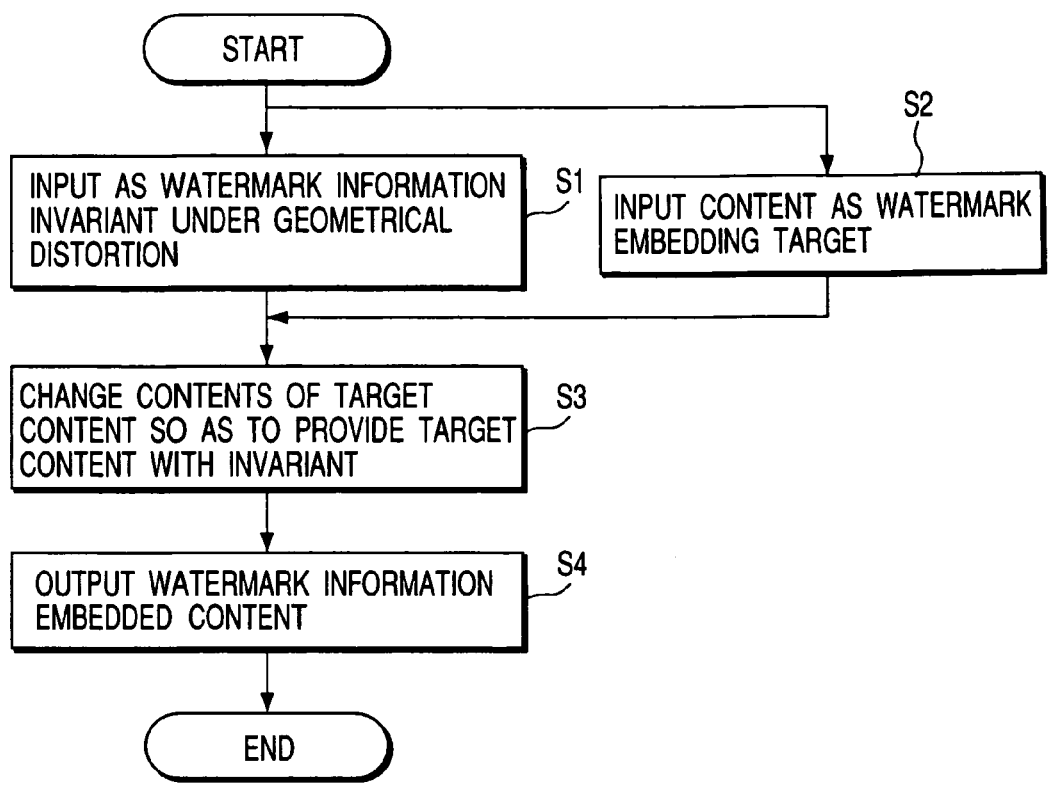
FIG. 5 shows one example of processing procedures for embedding a digital watermark while employing a topological invariant according to one aspect of the present invention.

FIG. 5 shows one example of processing procedures for embedding one topological invariant (e.g., homotopy class), as digital watermark information, into one content based on the above-stated principle.

A topological invariant (e.g., homotopy class) to be embedded into a content (watermark information embedding target content), is input (step S1). Alternatively, watermark information to be embedded may be applied to the target content and a topological invariant (e.g., homotopy class) corresponding to the watermark information may be obtained.

A watermark information embedding target content (e.g., image data) is input (step S2).

The content of the target content (e.g., pixel value if the content is image data) is modified so that the content has a topological invariant, i.e., the digital watermark detecting apparatus can detect the topological invariant of the content such as the image data (step S3), thereby embedding digital watermark information into the target content.

The content (e.g., image data) into which the watermark information has been embedded is output (step S4).

Figure 6:
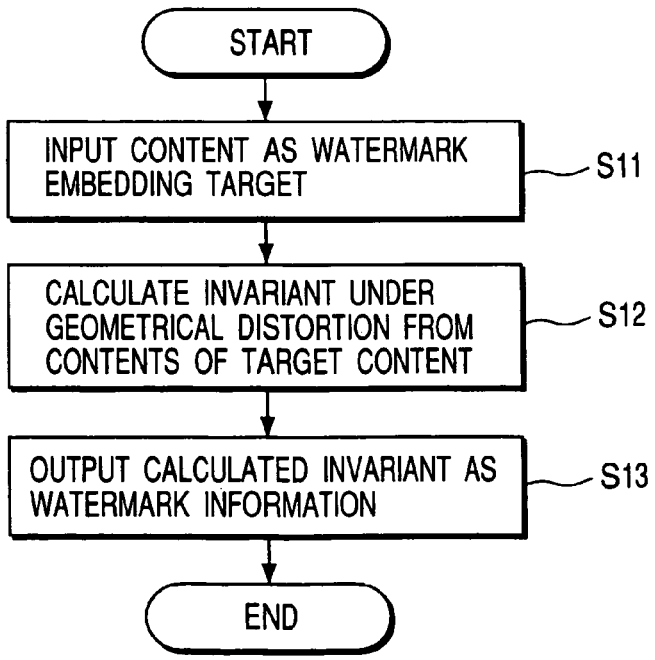
FIG. 6 shows one example of processing procedures for detecting a digital watermark while employing a topological invariant according to one aspect of the present invention.

FIG. 6 shows one example of processing procedures for detecting digital watermark information from one content (e.g., a still image) into which one topological invariant (e.g., a homotopy class) has been embedded as the digital watermark information, based on the above-stated principles.

A target content (e.g., image data) from which watermark information is detected is input (step S11).

The topological invariant of the content (e.g., image data) is calculated from the content (e.g., a pixel value if the content is the image data) (step S12).

The calculated topological invariant (e.g. homotopy class) is output as watermark information (step S13). Alternatively, watermark information corresponding to the calculated topological invariant (e.g., homotopy class) is obtained and output.

Figure 7:
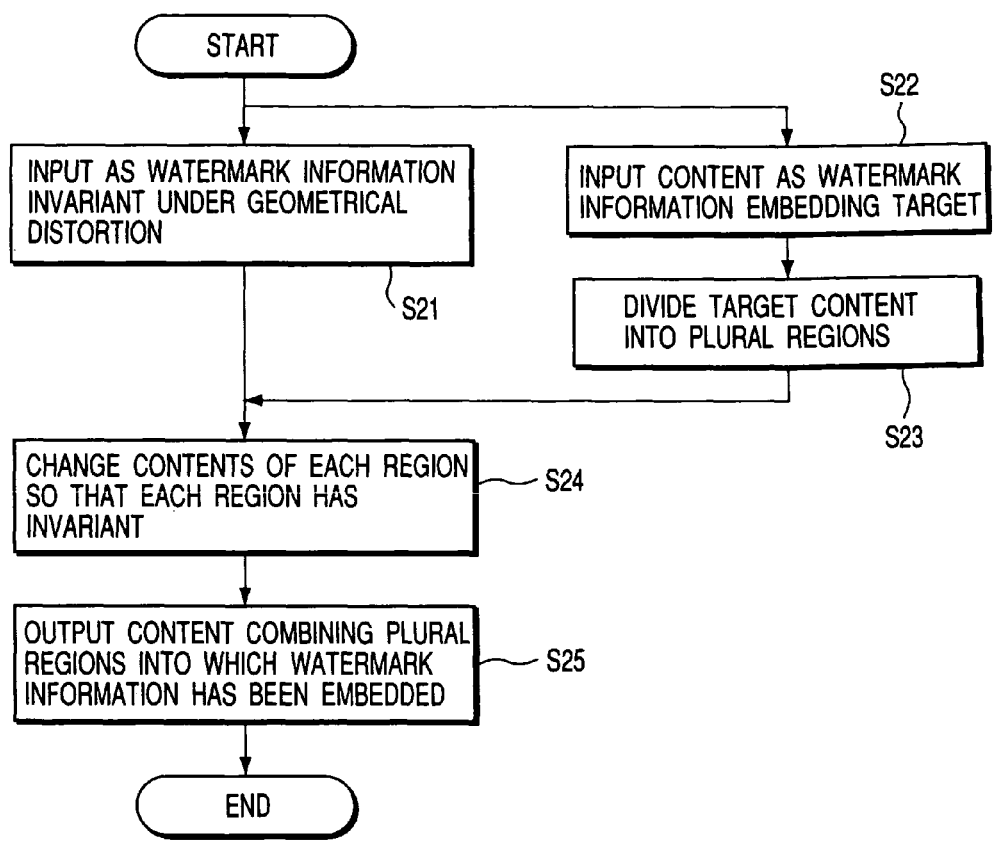
FIG. 7 shows another example of processing procedures for embedding a digital watermark while employing a topological invariant according to one aspect of the present invention.
Figure 8:
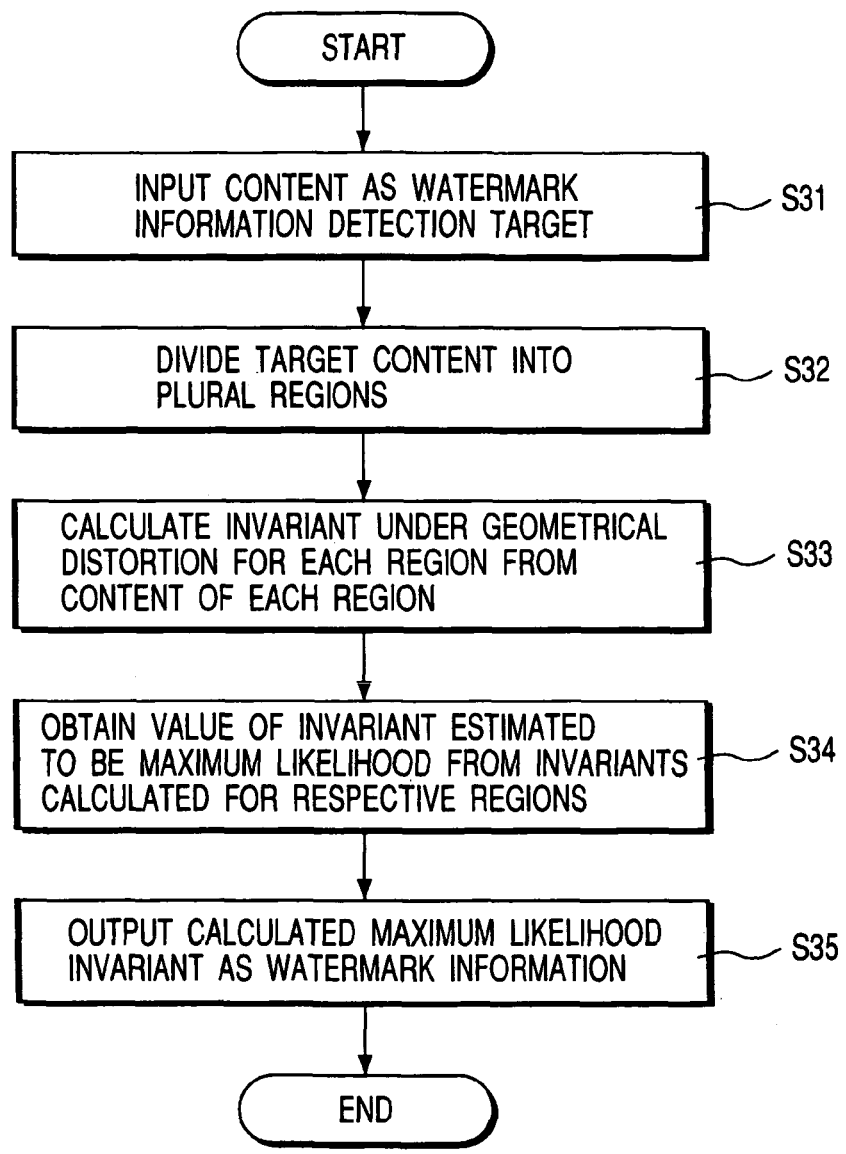
FIG. 8 shows another example of processing procedures for detecting a digital watermark while employing a topological invariant according to one aspect of the present invention.

The examples shown in FIGS. 5 and 6 show a case where one piece of digital watermark information is embedded into one content. Next, description will be given to a case where one piece of digital watermark information is embedded into a plurality of portions of a content. FIGS. 7 and 8 show one example of embedding processing procedures and detection processing procedures when one topological invariant (e.g., homotopy class) is embedded into respective regions (e.g., respective frames) of a content (e.g., moving image) formed of a plurality of regions (e.g., frames) or of a content (e.g., a moving image) dividable into a plurality of regions (e.g., frames), respectively.

As shown in FIG. 7, in a case of embedding a digital watermark, a topology invariant (e.g., homotopy class) to be embedded into a watermark information embedding target content is input (step S21). Alternatively, watermark information to be embedded is input and a topological invariant (e.g., homotopy class) corresponding to the watermark information is obtained.

A watermark information embedding target content (e.g., moving data) is input (step S22).

The target content is divided into a plurality of regions (e.g., frames) (step S23).

The content of the target content (e.g., a pixel value if the respective regions are the frames of the moving image data) is modified so that the respective regions have topological invariants, i.e., the digital watermark detecting apparatus can detect the topological invariant of the target content from the target content such as the moving image data or the like for the respective regions (e.g., frames) (step S24).

The content (e.g., moving data) including a plurality of regions (e.g., frames) into which the watermark information has been embedded is output (step S25).

FIG. 8 shows one example of processing procedures for detecting a digital watermark employing a topological invariant.

A target content (e.g., moving image data) from which watermark information is to be detected is input (step S31).

The target content is divided into a plurality of regions (e.g., frames) (step S32).

The topological invariants of the respective regions (e.g., frames) are calculated from the contents thereof (e.g., pixel values if the respective regions are the frames of moving image data), respectively (step S33).

The value of the maximum likelihood topological invariant which is estimated to be the most accurate from those calculated for the respective regions (e.g., frames) (step S34).

The maximum likelihood topological invariant (e.g., homotopy class) thus calculated is output as watermark information (step S35). Alternatively, watermark information corresponding to the maximum likelihood topological invariant (e.g., homotopy class) thus calculated is obtained and output.

The above description is related to the principles of the present invention. As can be seen, the digital watermark embedding apparatus 1 applies a topological invariant (homotopy class) corresponding to watermark information to be embedded to the target content, and the digital watermark detecting apparatus 2 detects the topological invariant from the target content and obtains watermark information corresponding to the topological invariant. There are several methods for supplying/detecting a homotopy class to/from a target content, some embodiments of which methods will be described hereinafter in more detail.

First Embodiment

In the first embodiment, a homotopy class which is inherently held by a target content is detected, and the difference (=homotopy class b−homotopy class a) of the homotopy class a from a homotopy class b corresponding to watermark information to be embedded into the target content is input to this target content. Please note if the topological space X is a cube (spherical space) of an n-order, a homotopy set is grouped so that the homotopy set is called a homotopy group. Thus, the homotopy class is the same as the element of the homotopy group.

One example of processing procedures in the first embodiment is basically the same as those shown in FIGS. 5 and 6 or 7 and 8.

Figure 9:
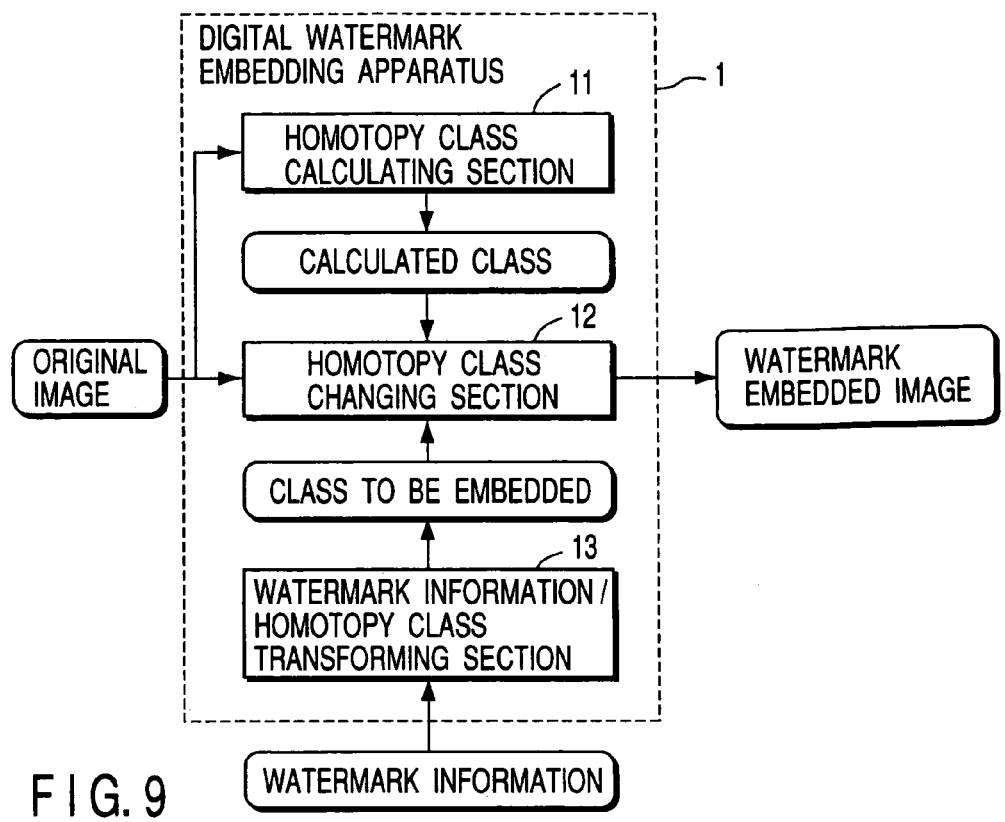
FIG. 9 shows a digital watermark embedding apparatus according to a first embodiment of the present invention.

FIG. 9 shows the digital watermark embedding apparatus 1 according to the first embodiment. The digital watermark embedding apparatus 1 comprises a homotopy class calculating section 11, homotopy class changing section 12 and watermark information/homotopy class transforming section 13.

The watermark information/homotopy class transforming section 13 inputs watermark information to be embedded and obtains a homotopy class corresponding to this watermark information (homotopy class to be embedded as watermark information). If control information indicating copy approval or copy prohibition is embedded as watermark information, for example, and copy approval is designated as watermark information to be embedded, a homotopy class having a value of +1 is output. If copy prohibition is designated, a homotopy class having a value −1 is output. Also, if an identification number such as the number of a copyright owner is embedded as watermark information, for example, and an identification number $\underline{n}$ is designated as watermark information to be embedded, then a homotopy class having a value of (n×C1+ C2) is output (where C1 and C2 are preset constants (integers)). Also, if control information indicating copy approval or copy prohibition and the identification number of a user are embedded as watermark information, for example, and copy approval and an identification number $\underline{n}$ are designated as the watermark information to be embedded, then a homotopy class having a value of (n×C3+C4)×(+1) is output. If copy prohibition and the identification number $\underline{n}$ are designated, a homotopy class having a value of (n×C3+C4) X (−1) is output (where C3 and C4 are present contents (integers)). Needless to say, these are only one example and other various methods are applicable.

While the homotopy class has a value of a positive integer, 0 or a negative integer, adjacent homotopy classes having close values which can be used for watermark information may be set distant from each other by a constant value (e.g., 2) or all usable homotopy classes may be used.

Further, if watermark information given as a numerical value is used as a homotopy class, the watermark information/ homotopy class transforming section 13 can be dispensed with.

As will be described later in detail, the homotopy class calculating section 11 calculates a homotopy class which an input original image inherently holds and outputs the homotopy class. If the homotopy class obtained as a result of the calculation is not an integer, an integer may be selected based on a predetermined standard. For example, the closest integer may be selected.

As will be described later in detail, the homotopy class changing section 12 inputs a homotopy class to be embedded as watermark information and a homotopy class inherently held by the original image and calculated by the homotopy calculating section 11, changes the original image so that the original image has the homotopy class to be embedded as watermark information, and then outputs the watermark information embedded image.

Figure 10:
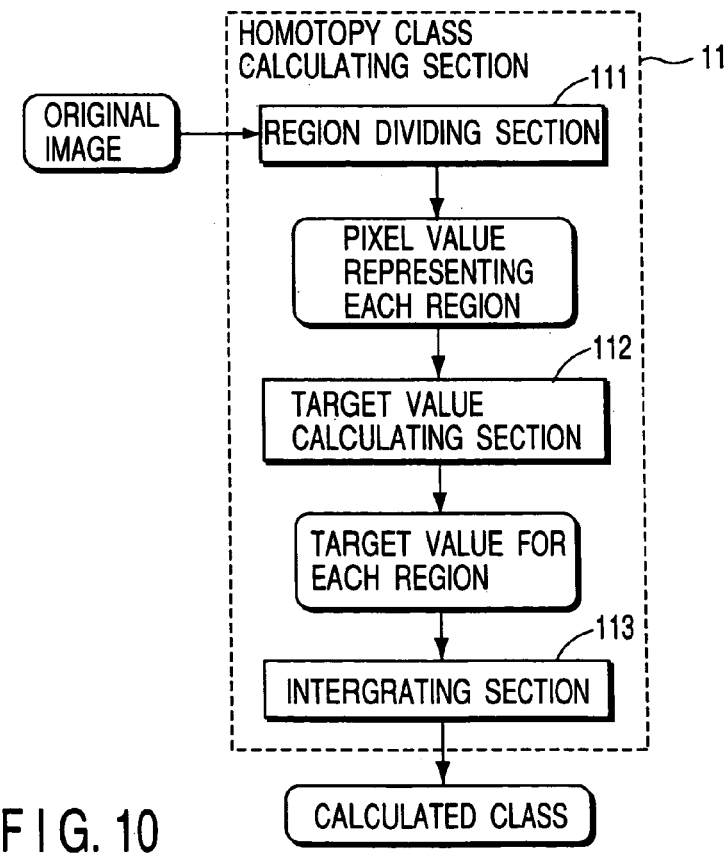
FIG. 10 shows a homotopy class calculation section in the digital watermark embedding apparatus and digital watermark detecting apparatus according to the first embodiment.

FIG. 10 shows the homotopy class calculating section 11. The homotopy class calculating section 11 comprises a region dividing section 111, target value calculating section 112 and integrating section 113.

The region dividing section 111 divides an image into a plurality of regions (e.g., blocks) and calculates pixel values representing the respective divided regions (which pixel values will be referred to as "representative pixel values" hereinafter). The description will be given while assuming that one divided region is one block. Needless to say, a divided region may be other than a block. Here, a block may comprise one pixel or a plurality of pixels.

If a divided region comprises one pixel, the representative coordinate values of the divided region is the coordinate values of the pixel. If a divided region comprises a plurality of pixels, the representative coordinate values of the divided region are, for example, the coordinate values of the center of gravity of the divided region.

Actually, it is preferable that not the entire bits of a pixel value but a preset, specific intermediate bit plane region which does not have a great influence on the quality of an image (which region have normally a plurality of continuous bits) is employed for embedding watermark information.

If a block is one pixel, the representative pixel value of the block is a value indicated by a specific bit string obtained by extracting the above-stated preset, specific intermediate bit plane region from all bits of the pixel value. If a block comprises a plurality of pixels, the representative pixel value of the block is the average value of the values indicated by the above-stated specific bit string for the plural pixels.

The number of vertical and horizontal pixels constituting one block or the content of a representative pixel value may be appropriately set or made selectable. Alternatively, they may be fixed to a preset one method.

Figures 11A, 11B:
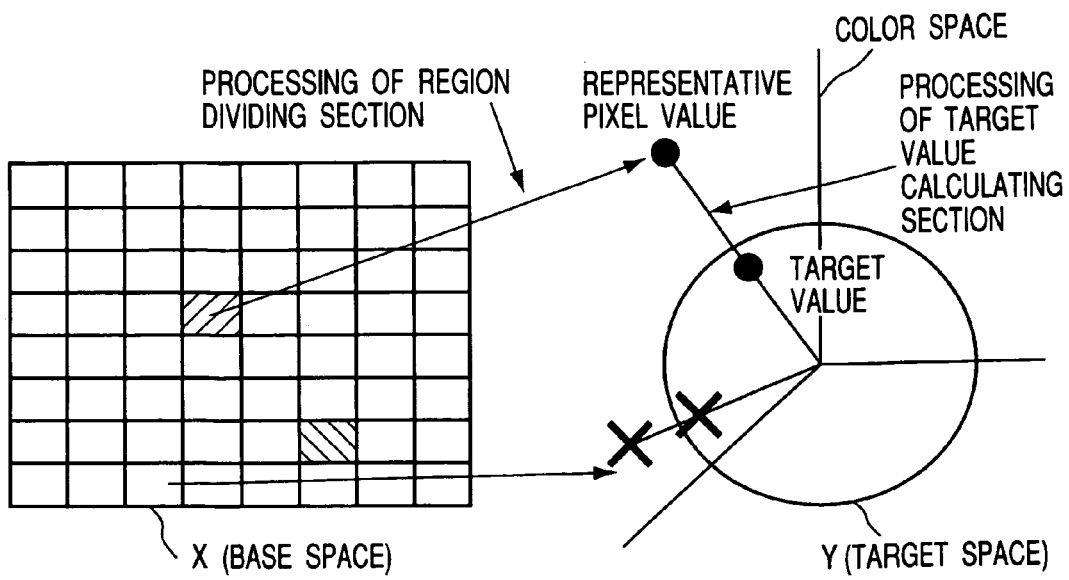
FIGS. 11A and 11B are explanatory views for processings relating to a topological invariant in the first embodiment.

FIG. 11A shows a manner in which an image is divided into a plurality of regions. FIG. 11B shows a manner in which a representative pixel value for each divided region is mapped to a pixel value space (which will be referred to as "a color space" hereinafter).

The target value calculating section 112 transforms the representative pixel value of each divided region (e.g., block) into a value referred to as a target value in a target space to be described later. Namely, the target value calculating section 112 obtains a target value for each divided region. FIG. 11B shows a manner in which a representative pixel value is transformed into a target value in the color space.

First, description will be given to a case where a representative pixel value is located in the target space. Next, description will be given to a case where a representative pixel value is not located in the target space but transformed into a target value in the target space by a transformation processing performed by the target value calculating section 112.

Figures 12A, 12B, 12C:
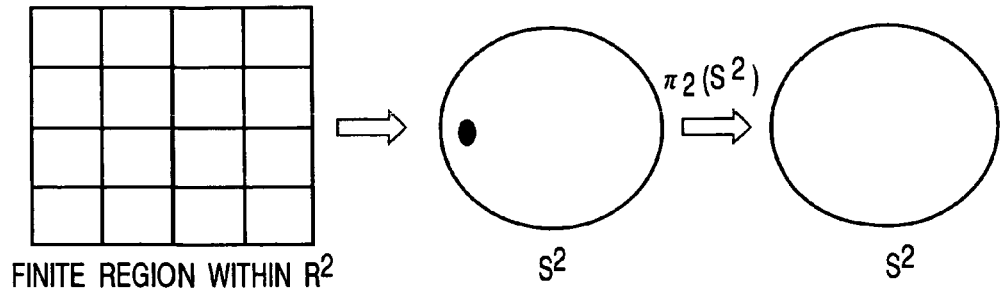
FIGS. 12A, 12B and 12C are explanatory views for a manner of identifying a base space with a two-dimensional spherical surface.

A target image into which watermark information is embedded is, for example, a finite region in a two-dimensional space. If the peripheral part of the image is regarded as one point, the image can be identified with a two-dimensional spherical surface $S^2$. This two-dimensional spherical surface $S^2$ will be referred to as "base space" hereinafter (FIG. 11A). FIGS. 12A, 12B and 12C show manners in which the base space is identified with the two-dimensional spherical space $S^2$.

On the other hand, the color space is a finite region in a three-dimensional space expressed by three coordinates of R, G and B. The original pixels of an image is, for example, a space having eight gradations and gradations fewer than the eight gradations are employed for watermark information. In any case, the color space to be handled herein has finite gradations but the color space is approximately regarded as a continuous space. By doing so, the color space becomes a finite region in a three-dimensional Euclidean space ($R^3$). The two-dimensional spherical surface $S^2$ (FIG. 11B) is set in this color space $R^3$. This color space will be referred to as "target space" hereinafter.

To be specific, the target space can be set by selecting an intermediate bit plane region which is less influenced by noise and which does not have a great influence on the quality of an image among pixel values and embedding a two-dimensional spherical surface into the intermediate bit plane region.

Figure 13:
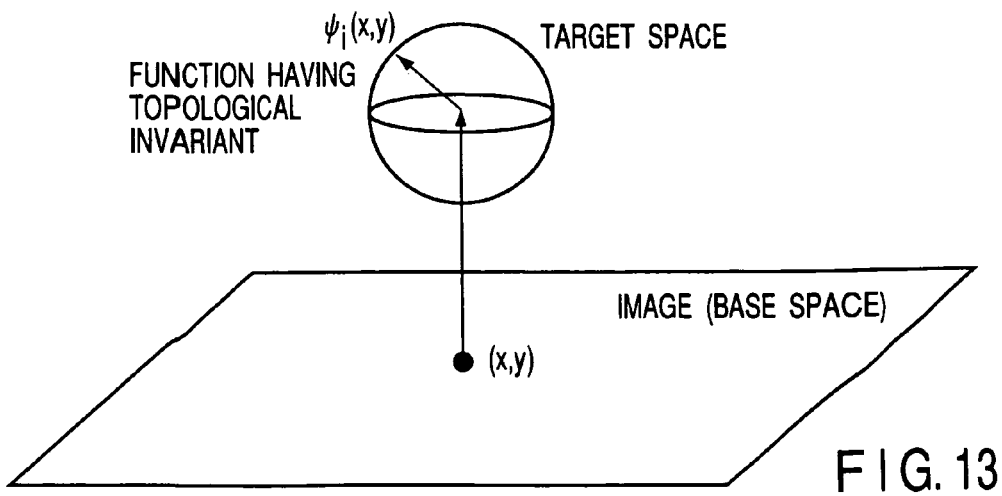
FIG. 13 shows an example of a base space and a target space in the first embodiment.

Based on the above, a target space is attached for each point in the base space and an image is allocated one point in the target space at each point in the base space. FIG. 13 shows this manner.

As can be understood from the above, one image is defined as a mapping from $S^2$ to $S^2$. If description is specified to the two-dimensional spherical surface $S^2$, a homotopy set becomes a homotopy group and a homotopy class can be regarded as an element of the homotopy group. It is known that the homotopy group of the mappings of such two-dimensional spherical surfaces is obtained by a formula $\pi_2(S^2)=Z$. In the formula, Z denotes entire integers. If the image is modified so that the element of this homotopy group expresses watermark information, it is possible to embed the watermark information into a target content.

Since the element of the homotopy group is invariant even by a local distortion to an image or a voice, it is possible to realize a digital watermark strongly resisting a local distortion. For example, if watermark information 0 is embedded, the pixel value of each divided region (e.g., block) is changed so as to express an element expressed by 1 in the homotopy group. If watermark information 1 is embedded, the pixel value of each divided region is changed so as to express an element represented by −1 in the homotopy group.

To create a pixel value in the target space to express an arbitrary element in the homotopy group, there is, for example, a method employing the following function $\Psi$. In the function, H is the height of an image, W is the width of the image, x and y are the coordinates of the image, $\underline{n}$ is a numerical value indicating an element in the homotopy group to be embedded, and $x_1$, $x_2$ and $x_3$ are the pixel values of R, G and B.

$\Psi_n(x,y)=(\chi_1(\theta,\phi),\chi_2(\theta,\phi),\chi_3(\theta,\phi))$, $\chi_1(\theta,\phi)=\cos\theta\cos\phi$, $\chi_2(\theta,\phi)=\cos\theta\sin\phi$, $\chi_3(\theta,\phi)=\sin\theta$, $\theta=2\pi x/H$, $\phi=2\pi n y/W$ For example, if the upper left of the image shown in FIG. 11A is set as an origin and the element n of the homotopy group is 1, then the outer periphery (end portion) of the image corresponds to (0, 0, 1), i.e., the north pole of the two-dimensional spherical surface in FIG. 11B, the center of the image corresponds to (0, 0, −1), i.e., the south pole of the two-dimensional spherical surface shown in FIG. 11B, and the intermediates therebetween continuously correspond to those of the two-dimensional spherical surface shown in FIG. 11B.

That is to say, one cycle around the equator in the base space corresponds to one cycle around the equator in the target space. The same thing is true for a case where the element of the homotopy group is −1; however, one cycle around the equator in the target space is counter to one cycle with the element n of the homotopy group of 1. Further, if the element of the homotopy group is 2 or −2, one cycle around the equator in the base space corresponds to two cycles around the equator in the target space.

The above-stated functions are only one example and various other methods are applicable.

Meanwhile, the target space which is a two-dimensional spherical surface is embedded into the color space. It does not, however, necessarily mean that the representative pixel value exists in the target space. It is rather normal that the image before watermark information is embedded, a content after a compression operation, an expansion operation or the like or a content provided trough the distribution path has a value in a region other than the target space. Also, as described above, if watermark information is embedded, a method for allocating a value (e.g., a value obtained by scaling a target value vector) with which the target space can be regenerated instead of allocating a value corresponding to the target space itself to the base space may be considered. In this case, at the time of embedding watermark information, the representative pixel value has already been located in a region other than the target space.

Further, as will be described later, the element of the homotopy group of an image is obtained from a representative value in the representative space (from an average pixel value of the divided region). Therefore, as a preprocess thereof, it is necessary to carry out a processing for associating a representative pixel value with one point in the target space.

Considering this, in this embodiment, the target value calculating section 112 sets a point closer to the representative pixel value out of points (which are two) at which a straight line, connecting the representative pixel value to the center of the two-dimensional spherical surface which is the target space, intersects this two-dimensional spherical surface, as a target value. Here, concepts including a straight line and a distance are introduced into the color space. To do so, it suffices to introduce appropriate coordinate systems and metrics thereinto in advance.

The integrating section 113 calculates integration for the obtained target value as shown in the following formula. The value of the element [f] of the homotopy group can be calculated based on Gauss-Bonnet theory. In the formula, f is a target value. The integration is performed in the base space.

$$I(f) = \frac{1}{4\pi} \int_0^H dx \int_0^W dy f \cdot \partial_x f \times \partial_y f$$

Actually, the target value is not in the continuous two-dimensional spherical surface but in a discrete space represented by a divided region (e.g., block). Therefore, a differential in an integral function is replaced by a difference and integration is replaced by sum. That is to say, an integral result is obtained by the following formula.

$$Id(f) = \frac{1}{4\pi} \sum_{i,j} f(i, j) \cdot (f(i+1, j) - f(i, j)) \times (f(i, j+1) - f(i, j))$$

It is expected that the integral result is an integer. However, since there are various reasons for causing an error, an integral closest to the integral result so that the integral represents the element of the homotopy group may be obtained.

Figure 14:
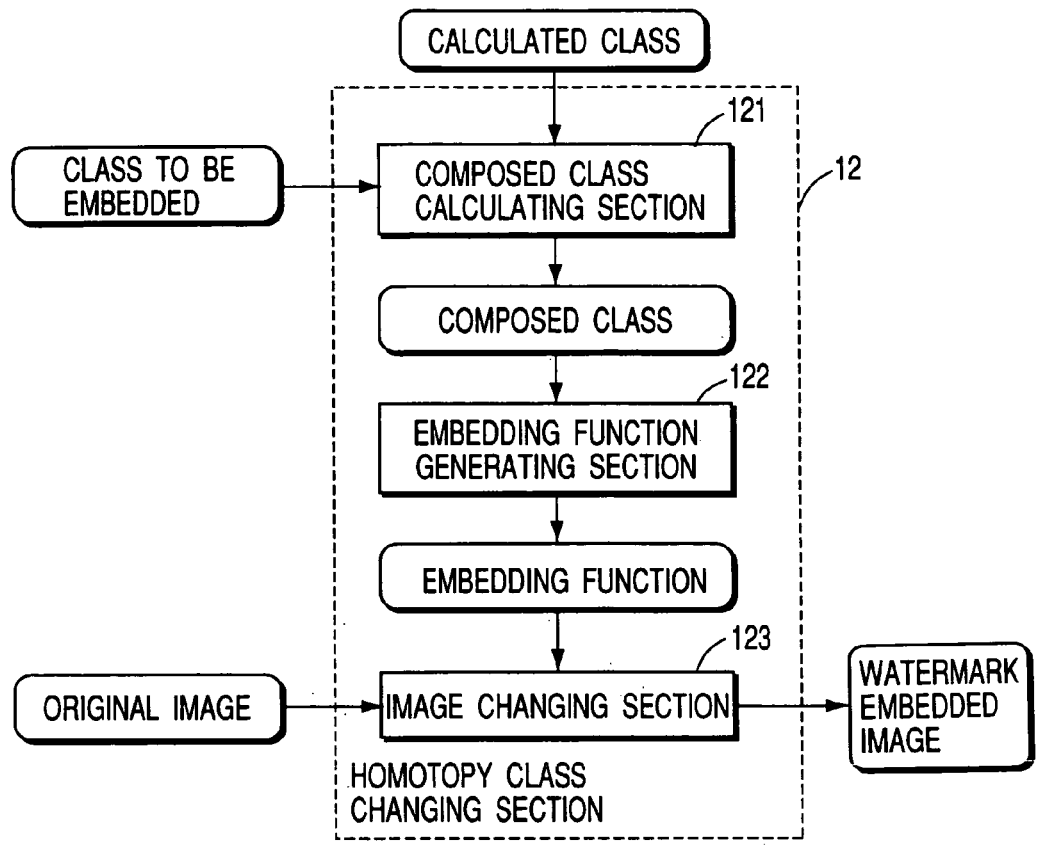
FIG. 14 shows a homotopy class changing section in the digital watermark embedding apparatus according to the first embodiment.

FIG. 14 shows the homotopy class changing section 12 shown in FIG. 9. The homotopy class changing section 12 comprises a composed class calculating section 121, embedding function generating section 122 and an image changing section 123. The composed class calculating section 121 inputs the element of a homotopy group held by an original image which is calculated by the homotopy class calculating section 11 and the element of a homotopy group to be embedded into a target image and calculates a value of the image is to be changed. For example, if the original image already holds a value a as the element of the homotopy group and a value b is to be embedded as an element of the homotopy group, the composition class calculating section 121 obtains (b−a) as a necessary an incremental value.

The embedding function generating section 122 generates an embedding function Ψ corresponding to the composed value (incremental value) from the composed value (incremental value). For example, $\Psi_{b-a}$ is generated as a to-be-embedded image using the previously defined functions. The embedding function is Ψ for giving $I(\Psi_{b-a})=b-a$.

The image changing section 123 superimposes the to-be-embedded image on the original image and thereby creates an embedded image having a value b in the element of the homotopy group. It is noted, however, this superimposition processing cannot provide a correct element of the homotopy group by superimposing the pixel values of the embedding function on the pixel values of the original image, for the following reason. Since the integral quantity defined above is nonlinear to a function, if two functions f and g are applied, the integral value is normally $I(f+g) \neq I(f)+I(g)$.

Figure 15A:
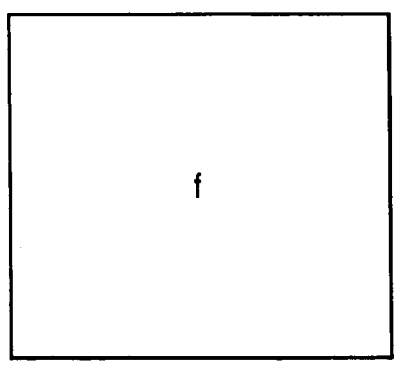
FIGS. 15A and 15B are explanatory views for the setting of a homotopy class in the first embodiment.
Figure 15B:
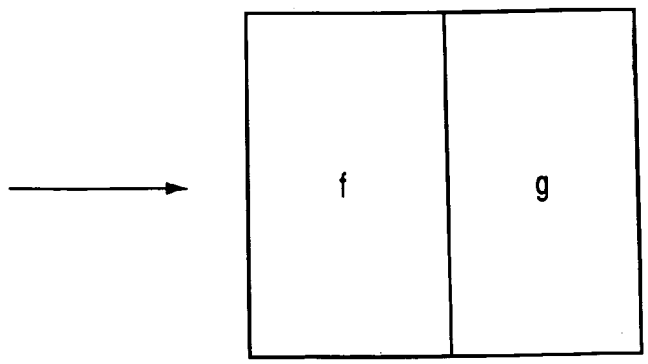

To accurately update the element of the homotopy class, therefore, the following processing may be considered as an example of a processing performed by the image changing section 123. In FIG. 15A, it is assumed that a function f expresses the representative pixel value of the original image. As shown in FIG. 15B, this function is transformed to a function in a region which is half the image (e.g., left half or right half). This operation is such that if the image is expressed by two-dimensional coordinates of $0 \leq x \leq 1$ and $0 \leq y \leq 1$ and a function f(x, y) is given, then the function is transformed to a function on $0 \leq x \leq \frac{1}{2}$ and $0 \leq y \leq 1$ by a function f(2x, y).

Next, with respect to the other half region (e.g., right half or left half), the function $\Psi_{b-a}(x, y)$ generated by the embedding function generation section 122 is transformed to a function g with $\frac{1}{2} \leq x \leq 1$, $0 \leq y \leq 1$ by $\Psi_{b-a}(2x-1, y)$.

Thereafter, the functions respectively defined in the half regions are regarded as one function and a function defined in the entire region is composed therefrom. If the function thus composed is expressed by f*g, it follows that $I(f*g)=I(f)+I(g)$ and, therefore, $I(f*\Psi_{b-a})=I(f)+I(\Psi_{b-a})=a+(b-a)=b$.

In the setting of these half regions, the above-stated operation can be variously performed. Also, the areas or the number of blocks of two types of regions may not be set to have a ratio of 1:1 but the other ratio.

Figure 16:
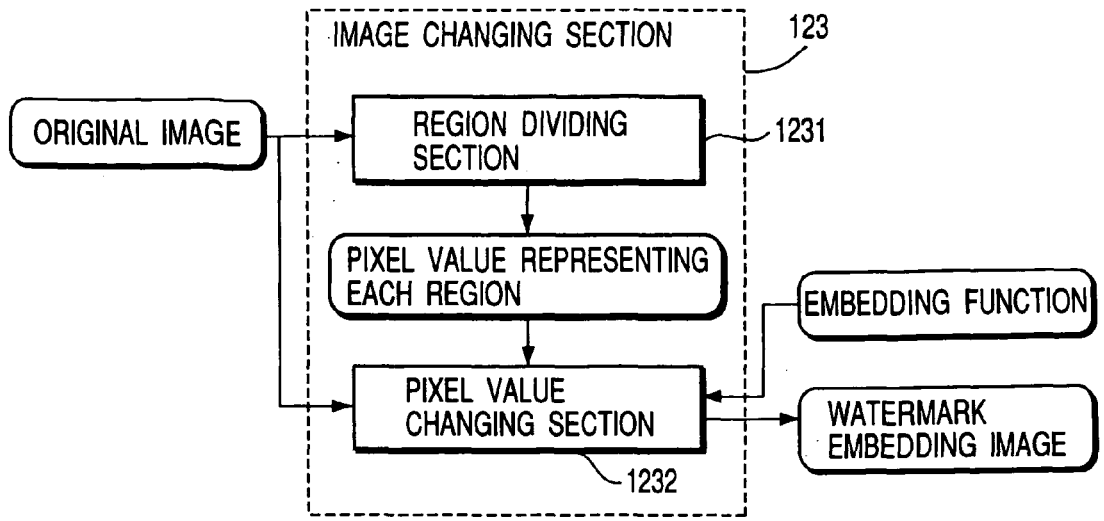
FIG. 16 shows the image changing section of the homotopy class change section in the digital watermark embedding apparatus according to the first embodiment.

FIG. 16 shows the image changing section 123 in the homotopy class changing section 12. The image changing section 123 comprises a region dividing section 1231 and pixel value changing section 1232. Alternatively, one region dividing section may be used as both the region dividing section 111 of the homotopy class calculating section 11 and the region dividing section 1231 of the image changing section 123.

The embedded image is expressed by a function (e.g., the above-stated composed function) for obtaining a target value. As shown in FIGS. 15A and 15B, the image changing section 123 changes the function. Please note that this operation is performed for only the bit portion to which the watermark is embedded and the remaining bit portion is not changed. Therefore, the region dividing section 1231 first divides the original image into a plurality of regions and obtains the representative pixel value of each divided region. Then, the pixel value changing section 1232 changes the values of pixels included in each divided region of the original image so that the respective representative pixel value can be replaced by the value $\Psi_n(x, y)$ of the composed function.

It is assumed that the representative pixel value of each divided region is obtained by, for example, the representative coordinate values of the divided region.

If a representative pixel value to be embedded into a certain divided region (e.g., block) is obtained and one block comprises one pixel, then the designated representative pixel value is written into a predetermined bit string portion used for watermark information on the respective pixel values of R, G and B. Alternatively, the designated representative pixel value (vector) may be scaled for each pixel so that the distance of the designated representative pixel value (vector) to the representative pixel value (vector) indicated by the value of the element of the predetermined bit string portion of the pixel value of the pixel and then the scaled value may be written into the predetermined bit string portion.

In addition, a certain representative pixel value is designated for a certain block and one block comprises a plurality of pixels, then the designated representative pixel value is written so that, for example, the average value of the predetermined bit string portions of these pixels becomes equal to the designated representative pixel value. For example, the same value (i.e., the designated representative pixel value) may be written into a plurality of pixels constituting one block or different values (which may include a case where not less than two pixels having the same value exist) may be written into a plurality of pixels constituting one block by obtaining discrete values from the designated representative pixel value by an appropriate method. Further, if discrete values are obtained from the representative pixel value, the discrete values may be optimized so that the values are less changed from the element values of the respective pixels based on the element values of the respective pixels and then the optimized discrete values may be written into the respective pixels. Alternatively, the designated representative pixel value (vector) may be scaled so that the representative pixel value is less changed from the values of the elements of the respective pixels based on the values of the elements of the respective pixels and written for each block.

Figure 17:
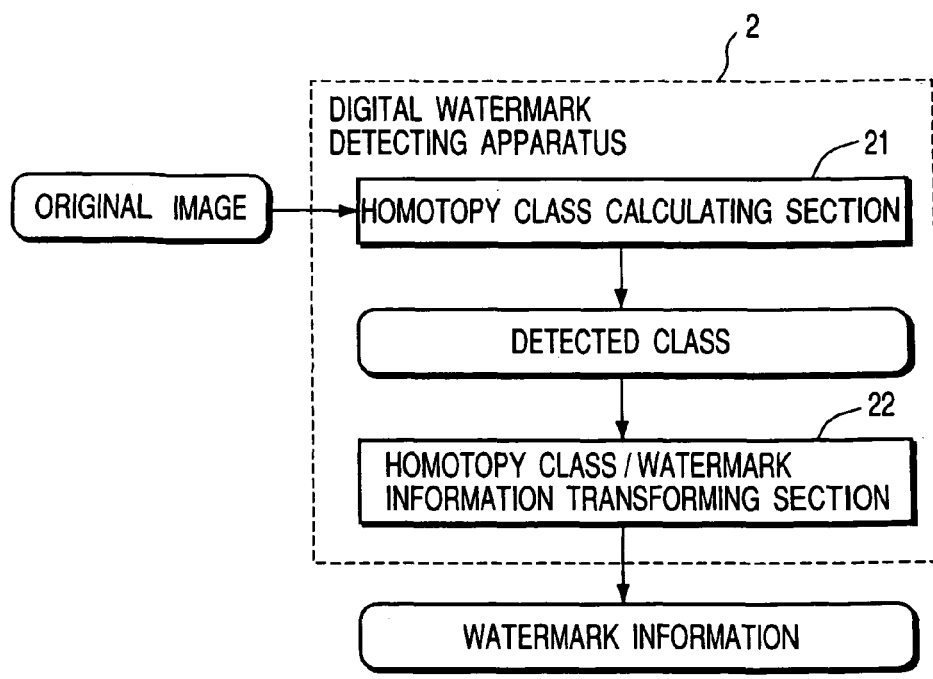
FIG. 17 shows a digital watermark detecting apparatus according to the first embodiment.

FIG. 17 shows a digital watermark detecting apparatus 2 detecting a digital watermark embedded by the digital watermark embedding apparatus 1 already stated above. The digital watermark detecting apparatus 2 comprises a homotopy class calculating section 21 and homotopy class/watermark information transforming section 22.

The homotopy class calculating section 21 is the same in configuration as the homotopy class calculating section 11 of the digital watermark embedding apparatus 1 (FIG. 10). The detailed description thereof will not be, therefore, given herein. To detect a digital watermark, as in the case of embedding, the region dividing section of the homotopy class calculating section 21 obtains a representative pixel value for each divided region, the target value calculating section thereof transforms the obtained representative pixel value into a target value, and the integrating section thereof calculates an element of a homotopy group.

Figure 18:
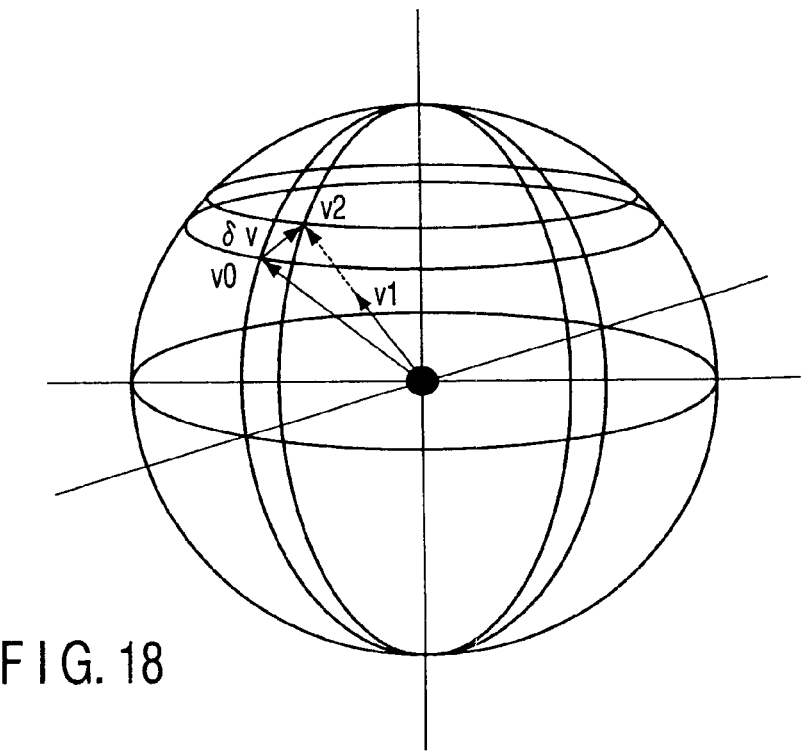
FIG. 18 is an explanatory view for a case where a watermark embedded content is distorted in the first embodiment.

As already described above, even if the representative pixel value is located in the target space in the image into which the digital watermark has been just embedded, there possibly occur cases where the representative pixel value does not exist in the target space due to noise, compression or an attack which occurs after embedding when the digital watermark is detected. Also, if the representative pixel value does not exist in the target space right after the embedding, it is considered that the representative pixel value does not exist in the target space at the time of detection. In this embodiment, however, the target value calculating section (FIG. 10) is capable of regenerating a correct target value (which is obtained by mapping the representative pixel value into the target space $S^2$) or a value close to the target value. Assume a case, for example, where the representative pixel value exists in the target space of the image right after the embedding. As shown in FIG. 18, even if the vector $V_0$ of the target value which has been embedded into the target content becomes a vector $V_1$ on the distribution path, the target value calculating section 112 can correct the vector $V_0$ to a vector $V_2$ in the target space. Even if the difference between $V_0$ and $V_1$ is large, the difference between $V_0$ and $V_2$ is as small as $\delta v$. It is, therefore, expected that the integral value obtained by the integrating section allows a correct value (homotopy class) or a value associated with the correct value to be restored.

The homotopy class/watermark information transforming section 22 performs inverse transformation to that of the watermark information/homotopy class transforming section 13 of the digital watermark embedding apparatus 1. Namely, the homotopy class/watermark information transforming section 22 inputs a homotopy class detected by the homotopy class calculating section 21 and obtains watermark information corresponding to the detected homotopy class. As a processing corresponding to that in the above-stated example, if control information indicating copy approval or copy prohibition is embedded as watermark information and a homotopy class having a value of 1 is detected, then information indicating copy approval is output as watermark information. If a homotopy class having a value of −1 is detected, information indicating copy prohibition is output as watermark information. In addition, if the identification number of a copyright owner is embedded as watermark information and a homotopy class having a value of m is detected, for example, then an identification number (m−C2)/C1 is output as watermark information. If control information indicating copy approval or copy prohibition and the identification number of a user are embedded as watermark information and a homotopy class having a value of +|m| is detected, for example, then information indicating copy approval and an identification number (|m|−C2)/C1 are output as watermark information. If a homotopy class having a value of −|m| is detected, information indicating copy prohibition and an identification number (|m|−C2)/C1 are output as watermark information. This is only one example and various other methods are applicable.

As described above, it is assumed that the embedded homotopy class has a predetermined value and the embedded watermark has a predetermined value. The detecting section 2 stores the relationship between the homotopy class and its value. If the detected value is not predetermined, it can be assumed that there is no watermark corresponding to the homotopy class. If there does not exist watermark information corresponding to the homotopy class detected by the homotopy class calculating section 21, the homotopy class/ watermark information transforming section 22 may obtain watermark information by setting a homotopy class closest to the homotopy class detected by the homotopy class calculating section 21 and watermark information corresponding to which exists, as a detected homotopy class.

In addition, the homotopy class detected by the homotopy class calculating section 21 is almost between the value of the homotopy class corresponding to certain watermark information and the value of the homotopy class corresponding to the other watermark information, the homotopy class/watermark information transforming section 22 may output information indicating an error (or information indicating these pieces of watermark information and an error).

Furthermore, if the value of the homotopy class detected by the homotopy class calculating section 21 is employed as watermark information, the homotopy class/watermark information transforming section 22 can be dispensed with.

If one apparatus serving both the digital watermark embedding apparatus and the digital watermark detecting apparatus is used, one homotopy class calculating section can be used as both the homotopy class calculating section 11 of the digital watermark embedding apparatus and the homotopy class calculating section 21 of the digital watermark detecting apparatus.

In the above description, the homotopy class is embedded into the entire image data. Alternatively, the homotopy class may be embedded into a specific part of the image data. In the latter case, the embedding function generating section 122 generates a function for embedding a designated homotopy class into the specific part of the image data, the image changing section 123 embeds a representative pixel value only into the specific part of the image data. In case of FIG. 15B, for example, the designated homotopy class is written only into the right half region and the left half region has no change in pixel value. During detection, the integrating section performs a calculation with the preset, specific part of the image data set as an integral range, thereby detecting a homotopy class embedded into the specific part of the image data.

It is noted that image data often includes important information in the central portion of an image. Therefore, it is also possible to embed a homotopy class not into the peripheral portion of the image but only into the central portion thereof. In that case, it suffices that the value of the function becomes constant in the peripheral portion.

As described above, in this embodiment, the value of the topological invariant (e.g., homotopy class) of a target content is set at a value corresponding to watermark information to be embedded. Therefore, even if a local distortion such as a StirMark attack or D-A-D conversion to the target data occurs, it is possible to maintain and store the topological invariant, to detect an accurate topological invariant from the target content and to obtain accurate watermark information corresponding to the topological invariant thus detected.

Other embodiments of the present invention will be described. The same portions as those of the first embodiment will be indicated in the same reference numerals and their detailed description will be omitted.

Second Embodiment

In the first embodiment, a composed function of the representative pixel value of an original image and an embedding function is created and the composed function is used to replace the representative pixel value of the original image, thereby generating a watermark information embedded image. In the second embodiment, by contrast, the representative pixel value of an original image is not employed and the representative value is replaced by an embedding function corresponding to a class to be embedded. That is to say, a homotopy class b corresponding to watermark information to be embedded is input to a target content without detecting a homotopy class a which the target content inherently holds.

Now, description will be given while centering around the differences between the first embodiment and the second embodiment.

Figure 19:
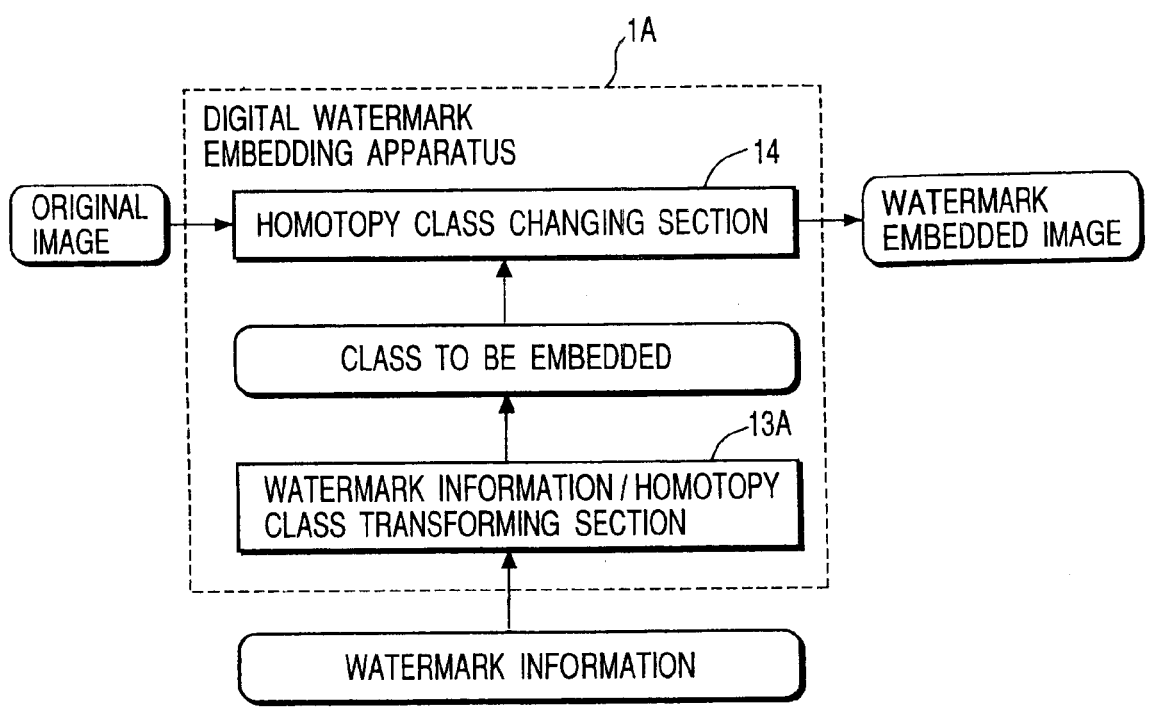
FIG. 19 shows a digital watermark embedding apparatus according to a second embodiment of the present invention.

FIG. 19 shows a digital watermark embedding apparatus 1A according to the second embodiment. The digital watermark embedding apparatus 1A comprises a homotopy class changing section 14 and watermark information/homotopy class transforming section 13A. The watermark information/homotopy class transforming section 13A is the same as the watermark information/homotopy class transforming section 13 in the first embodiment.

Figure 20:
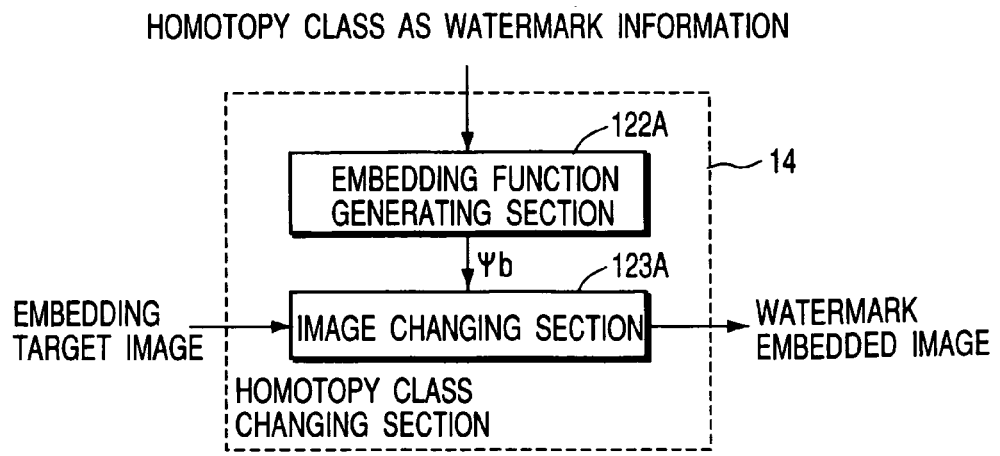
FIG. 20 shows one example of a homotopy class changing section in the digital watermark embedding apparatus according to the second embodiment.

FIG. 20 shows one example of the homotopy class changing section 14. The homotopy class changing section 14 comprises an embedding function generating section 122A and an image changing section 123A. The image changing section 123A is basically the same in configuration as the pixel value changing section 1232 in the first embodiment (corresponds to a case of embedding g shown in FIG. 12B to the entire image.)

In the first embodiment, the embedding function generating section 122 is input with an incremental value (b−a) of the element of the homotopy class, i.e., (value b of the element of a homotopy class to be embedded—value a of the element of a homotopy class inherently held by the original image) from the composed class calculating section 121 and generates an embedding function, e.g., a function $\Psi_{b-a}$ for giving an image corresponding to the incremental value.

The embedding function generating section 122A in the second embodiment, by contrast, inputs the element b of a homotopy class to be embedded as watermark information and outputs an embedding function corresponding to the element b. For example, the embedding function generating section 122A generates an embedding function $\Psi_b$ as an embedded image using the functions previously defined. At this moment, the embedding function is a function for giving $I(\Psi_b)=b$.

The image changing section 123A changes the values of pixels included in each divided region of the original image so that the representative value of each divided region (e.g., block) of the original image can be replaced by the value of the embedding function (e.g., $\Psi_b$) in, for example, the same manner as that described in the first embodiment.

Next, description will be given to the variation of the homotopy class changing section 14.

The embedding function generating section 122A of the homotopy class changing section 14 shown in FIG. 20 may generates, as an embedding function corresponding to the element b of the homotopy class, the family of a function belonging to the same class b, and the image changing section 123 may select a function having the smallest degree of degrading the image and change the pixel value based on the value of the function.

Figure 21:
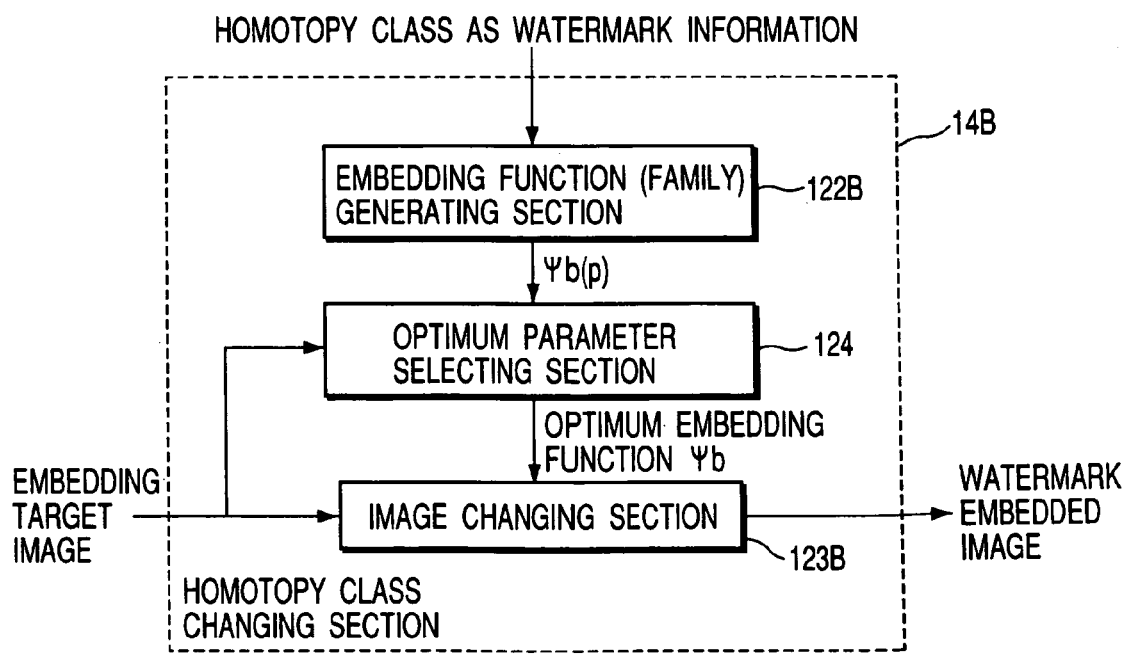
FIG. 21 shows another example of a homotopy class changing section in the digital watermark embedding apparatus according to the second embodiment.

FIG. 21 shows one example of the homotopy class changing section 14B as a variation of the homotopy class changing section 14. The homotopy class changing section 14B comprises an optimum parameter selecting section 124 in addition to the constituent elements shown in FIG. 20. The embedding function generating section 122B generates an embedding function having a certain parameter. The parameter may be single-variable or multivariable. If this parameter is expressed as p, the embedding function becomes a function which form is changed according to the parameter p. An image quality evaluation value in a case where the pixel value of the original image is changed by this embedding function is calculated, and such a parameter p by which the evaluation value provides the best image quality is selected. Using the embedding function determined by the selected parameter p, the image changing section 123B changes the pixel value of the original image.

As shown in, for example, FIG. 22, in a function obtained by scaling an embedding function having a value in a unit two-dimensional spherical surface in a radial direction, the family of an embedding function obtained by expressing the scale as p is defined. By determining the parameter p so that the sum of squares of the distances between the present representative pixel values x of respective divided region (e.g., block) and the value x' (p) of the corresponding embedding function throughout all the divided regions become a minimum, it is possible to perform embedding to minimize the influence of the embedding on the quality of the image.

Besides the parameter for uniformly scaling the embedding function, a parameter for uniform rotation or, more generally, a parameter expressing non-uniform coordinate transformation can be employed.

If a certain representative pixel value to be embedded is designated for a certain divided region (block) and one block comprises one pixel, the image changing section 123 writes, for example, the designated representative pixel value into a predetermined bit string portion employed for watermark information of the respective pixel values of R, G and B of the pixel.

Also, if a certain representative pixel value is designated for a certain divided region (block) and one block comprises a plurality of pixels, then the image changing section 123 performs a write operation, for example, so that the average value of the predetermined bit string portions of these pixels become equal to the designated pixel value. For example, the same value (i.e., the designated representative pixel value) into all the plurality of pixels constituting one block or may obtain discrete values by an appropriate method and write these different values into the respective pixels.

It is noted that the above-stated variations are also applicable to the first embodiment. Further, the digital watermark detecting device of the second embodiment is the same as that of the first embodiment.

As described above, in the second embodiment, a homotopy class corresponding to watermark information to be embedded is set to a target content. Therefore, even if a local distortion such as a StirMark attack or D-A-D conversion is applied to the target content, it is possible to maintain and store the homotopy class, to detect an accurate homotopy class from the target content and to obtain accurate watermark information corresponding to the homotopy class.

Third Embodiment

In the first embodiment, a composed function of the representative pixel value of the original image and the embedding function is created and the composed function replaces the representative pixel value of the original image, thereby creating a watermark information embedded image. In the second embodiment, an embedding function corresponding to a homotopy class to be embedded replaces the representative value without employing the representative pixel value of the original image.

The first and second embodiments are combined. Namely, as first watermark information, the function f is embedded according to the second embodiment and then, as the second watermark information, the function g is embedded according to the first embodiment. By doing so, it is possible to multiplex the functions f and g and to embed the multiplexed function. In this case, as shown in, for example, FIG. 15B, the function f is embedded into the left half region, the function g is embedded into the right half region and (f+g) is embedded as a whole.

Now, description will be given while centering around the differences of the third embodiment from the first and second embodiments.

FIG. 23 shows a digital watermark embedding apparatus according to the third embodiment. The digital watermark embedding apparatus comprises a first digital watermark embedding section 1-1 which is basically the same in configuration as the digital watermark embedding apparatus according to the second embodiment and a second digital watermark embedding section 1-2 which is basically the same in configuration as the digital watermark embedding apparatus according to the first embodiment.

FIG. 24 shows a digital watermark detecting apparatus according to the third embodiment. The digital watermark embedding apparatus comprises a first digital watermark detecting section 2-1 and second digital watermark detecting section 2-2 which are basically the same in configuration as the digital watermark detecting apparatuses according to the first and second embodiments.

In this case, first, if a target content and the first watermark information (corresponding to a homotopy class [f]) are input into the first digital watermark detecting section 1-1, the homotopy class [f] is embedded into the entirety of the target content as shown in, for example, FIG. 15A.

Next, if the content into which this homotopy class [f] has been embedded and the second watermark information (corresponding to a homotopy class [g]) are input into the second digital watermark embedding section 1-2, a content having the homotopy class [f] embedded into a preset, predetermined part thereof and the homotopy class [g] embedded into the remaining part thereof is obtained as shown in, for example, FIG. 15B. In this case, the homotopy class inherently held by the original image in the first embodiment is the homotopy class [f] corresponding to the first watermark information. Also, the difference (between the homotopy class to be embedded and the homotopy class inherently held by the original image) is not obtained in the first embodiment. Instead, the homotopy class [g] corresponding to the second watermark information is processed as such a difference.

During detection, if the content (the content output from the second watermark embedding section 1-2 shown in FIG. 23) is input into the first digital watermark detecting section 2-1, an integrating section performs a calculation with the preset, predetermined part of the target content set as an integral range, thereby detecting the homotopy class [f] embedded into the preset, predetermined part of the target content.

Next, if the content (the content output from the second digital watermark embedding section 1-2 shown in FIG. 23) is input into the second digital watermark embedding section 2-2, the integrating section performs a calculation with the remaining part of the target content set as an integral range, thereby detecting the homotopy class [g] embedded into the remaining part of the target content.

It is noted that the first digital watermark detecting section 2-1 and the second digital watermark detecting section 2-2 may be operated in an opposite order to that described above or may be operated in parallel.

Further, the second digital watermark detecting section 2-2 may detect the composed homotopy class [f+g] embedded into the entirety of the target content, subtract the homotopy class [f] obtained by the first digital watermark detecting section 2-1 from the composed homotopy class [f+g] and then obtain the homotopy class [g].

Methods other than those stated above are applicable, as well as follows.

For example, a target content and the first watermark information (corresponding to a homotopy class a) are input into the first digital watermark embedding section 1-1 and the homotopy class a is embedded into the entirety of the target content.

Next, the content into which this homotopy class a has been embedded and the second watermark information (corresponding to a homotopy class b) are input into the second digital watermark embedding section 1-2. The difference (b−a) between the homotopy class b to be embedded and the homotopy class a inherently held by the original image is obtained. The content having the homotopy class a embedded into a preset, predetermined part of the target content and the homotopy class (b−a) embedded into the remaining part of the target content is obtained. Therefore, the homotopy class a+(b−a)=b is embedded into the entire content.

During detection, if the content (the content output from the second digital watermark embedding section 1-2 shown in FIG. 23) is input into the first digital watermark detecting section 2-1, an integrating section performs a calculation with only the preset, predetermined part of the target content set as an integral range, thereby detecting the homotopy class a embedded into the preset, predetermined part of the target content.

Next, if the content (the content output from the second digital watermark embedding section 1-2 shown in FIG. 23) is input into the second digital watermark detecting section 2-2, the integrating section performs a calculation with the entirety of the target content set as an integral range, thereby detecting the homotopy class b embedded into the entirety of the target content.

It is noted that the first digital watermark detecting section 2-1 and the second digital watermark detecting section 2-2 may be operated in an opposite order to the order described above or may be operated in parallel.

Further, the second digital watermark detecting section 2-2 may detect the homotopy class (b−a) embedded into the preset, predetermined part of the content, add the homotopy class a obtained by the first digital watermark detecting section 2-1 to the homotopy class (b−a) and obtain the homotopy class b.

In the third embodiment, as in the case of the preceding embodiments, all of or a part of the overlapped constituent elements of the first digital watermark embedding section 1-1 and the second watermark embedding section 1-2 may be used in common. The same thing is true for the first digital watermark detecting section 2-1 and the second digital watermark detecting section 2-2. If all of the digital watermark embedding sections 1-1, 1-2 and the digital watermark detecting sections 2-1, 2-2 are provided, all of or a part of overlapped constituent elements may be used in common.

Further, description has been given above to a case of duplexing the homotopy classes. It is also possible to obtain multiplexed (triplex or more) homotopy classes.

Description has been given so far while taking a case where a still image is a target content as an example. Now, description will be given to embodiments in a case where a moving image is a target content.

Fourth Embodiment

In the fourth embodiment, a digital watermark is embedded into a moving image instead of detecting a homotopy class inherently held by the target content as seen in the first embodiment.

One example of processing procedures in this embodiment is basically the same as those shown in FIGS. 7 and 8.

Figure 25:
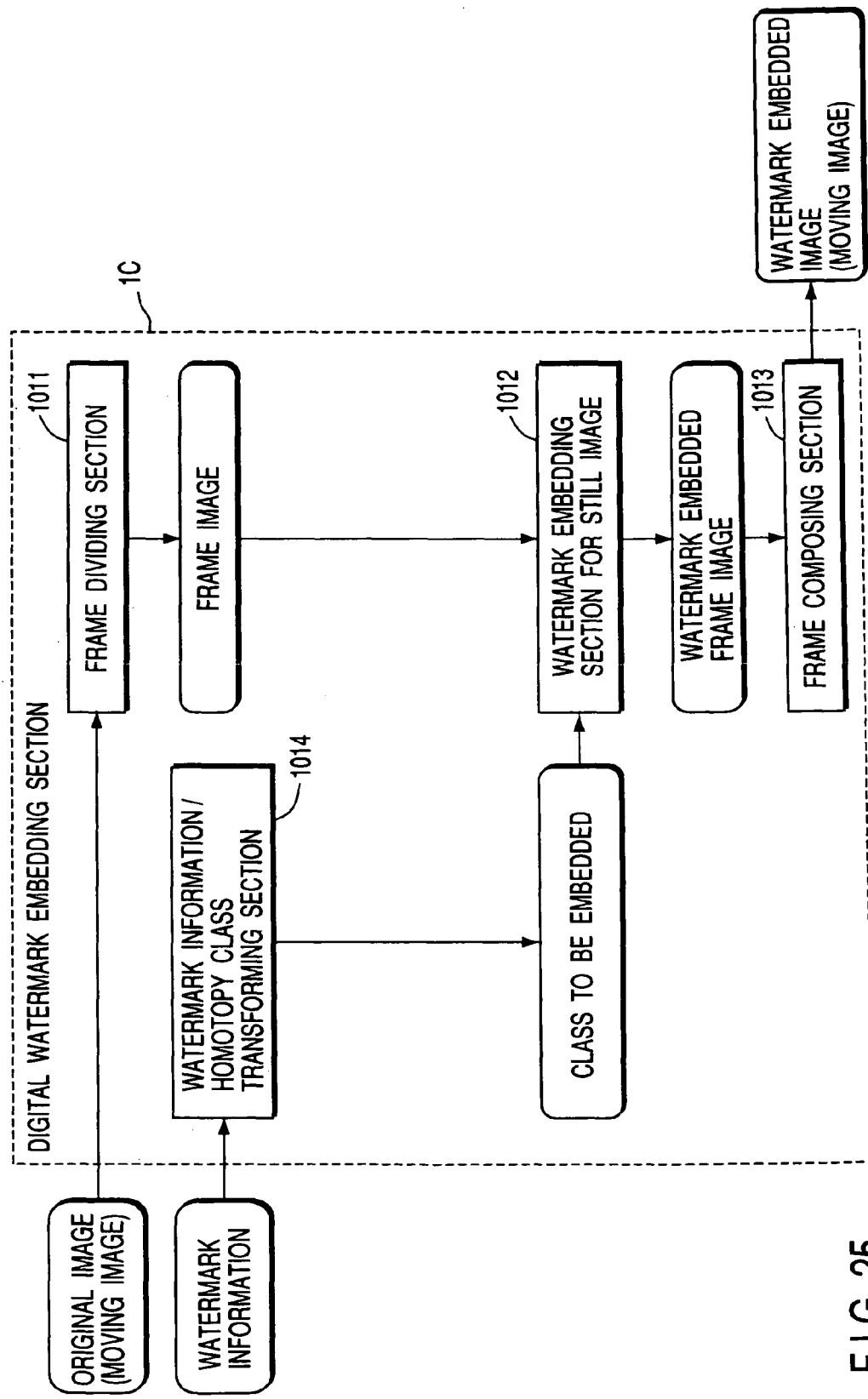
FIG. 25 shows a digital watermark embedding apparatus according to a fourth embodiment of the present invention.

FIG. 25 shows a digital watermark embedding apparatus 1C according to the fourth embodiment. The digital watermark embedding apparatus 1C comprises a frame dividing section 1011, digital watermark embedding section 1012 embedding digital watermark information into a still image, frame composing section 1013, watermark information/homotopy class transforming section 1014.

The watermark information/homotopy class transforming section 1014 is the same as the watermark information/homotopy class transforming section 13 (FIG. 9) in the first embodiment.

The frame dividing section 1011 divides a moving image into a plurality of frame to create continuous still images.

The digital watermark embedding section 1012 embedding digital watermark information into a still image is basically the same in configuration as the digital watermark embedding apparatus 1 in the first embodiment. The digital watermark embedding section 1012 embeds a value indicating a class in a homotopy group applied as watermark information into each of the frames obtained by the frame dividing section 1011. In this case, however, a homotopy class corresponding to the digital watermark is embedded into a specific part of the image data (e.g., right half region) without obtaining a homotopy class inherently held by the original image or moving the homotopy class inherently held by the original image to, for example, the left half region of the image data, in the same as the second embodiment. That is to say, the embedding function generating section in the image changing section (FIG. 14) generates only a function for embedding a designated homotopy class into the specific part of the image data in the first embodiment. The image changing section embeds a representative pixel value into the specific part of the image data based on this function. In FIG. 15B, for example, the designated representative pixel value is written only into the right half region and the left half region has no change in pixel value.

As a result, as shown in FIG. 15B, for example, the homotopy class g is embedded into the right half region while some homotopy class r is embedded into the left half region.

In this case, the element of the homotopy group of the obtained image may sometimes differ from the element to be embedded (e.g., if r=1, g+1 is embedded into the frame). However, the digital watermark detecting apparatus to be described later can estimate the maximum likelihood class from the homotopy classes obtained from a plurality of frames. Therefore, if the same homotopy class is embedded into a plurality of frames, the classes of the image eventually obtained are discrete around the value of the class to be embedded, making it possible to estimate a statistically accurate class.

The frame composing section 1013 recomposes a plurality of frames obtained as a result of embedding the homotopy class into the respective frames of the image data by the digital watermark embedding section 1012 for the still image into a moving image having an original order.

Figure 26:
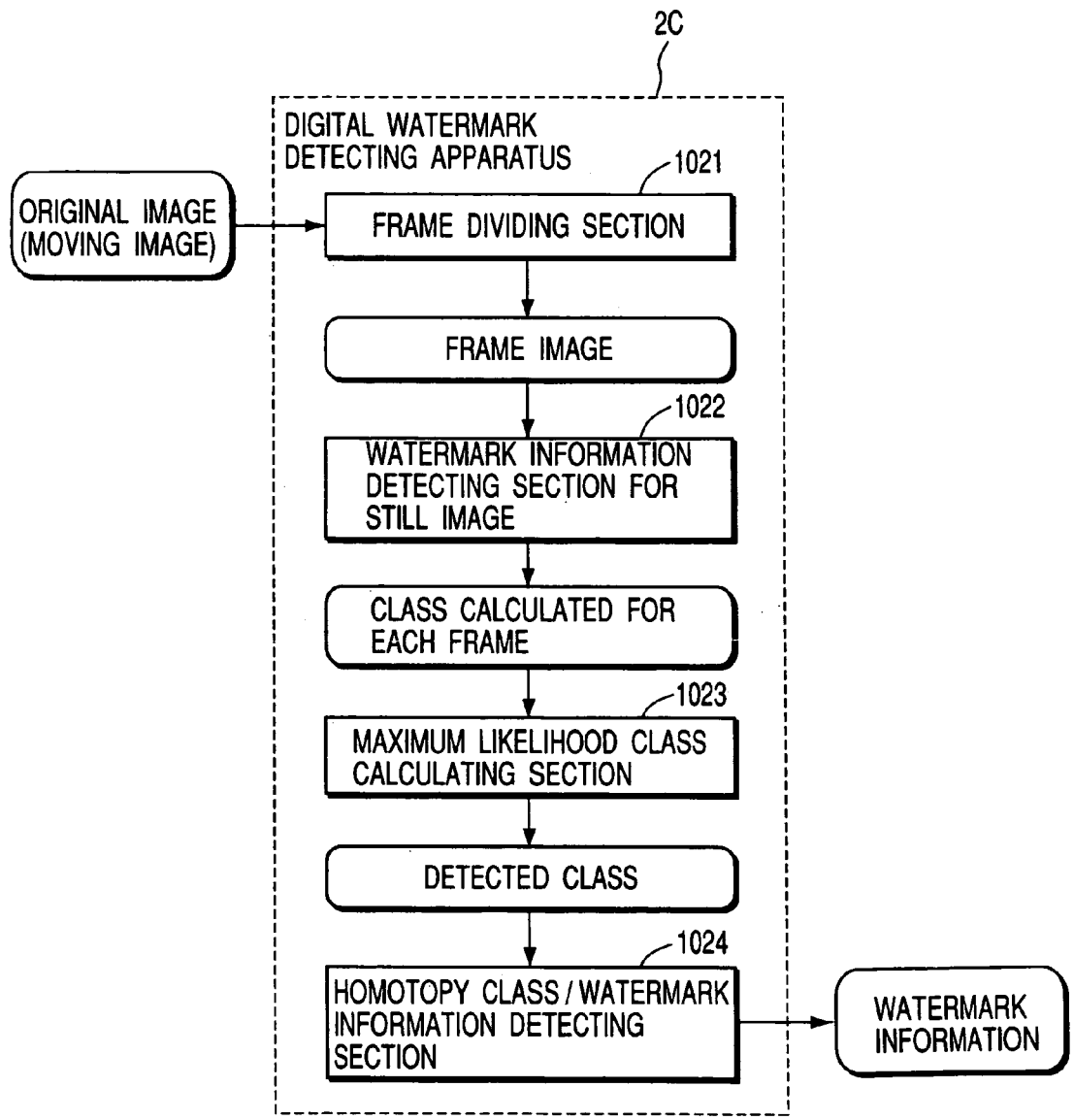
FIG. 26 shows a digital watermark detecting apparatus according to the fourth embodiment.

FIG. 26 shows a digital watermark detecting apparatus 2C according to the fourth embodiment. The digital watermark detecting apparatus 2C comprises a frame dividing section 1021, digital watermark detecting section 1022 detecting a digital watermark from a still image, maximum likelihood class calculating section 1023, and homotopy class/watermark information transforming section 1024.

The frame dividing section 1021 divides a moving image into a plurality of frames to create continuous still images.

The digital watermark detecting section 1022 detecting a digital watermark from the still image is basically the same in configuration as the homotopy class calculating section 11 in the digital watermark detecting apparatus according to the first embodiment. The digital watermark detecting section 1022 detects a value indicating an element in a homotopy group for each of the frames obtained by the frame dividing section 1021.

The maximum likelihood class calculating section 1023 estimates the value of the maximum likelihood class from the values of the classes obtained for the respective frames by the digital watermark detecting section 1022 detecting a digital watermark from a still image. For example, the maximum likelihood class calculating section 1023 can estimate the value of the maximum likelihood class by a value obtained with the highest frequency or an average value. The maximum likelihood class calculating section 1023 outputs the estimated value as a detected homotopy class.

The homotopy class/watermark information transforming section 1024 is basically the same in configuration as the homotopy class/watermark information transforming section 22 in the digital watermark detecting apparatus in the first embodiment. The homotopy class/watermark information transforming section 1024 inputs the homotopy class detected by the maximum likelihood class calculating section 1023 and obtains watermark information corresponding to the detected homotopy class.

It is described above that the fourth embodiment is applied to a case of embedding a digital watermark into a moving image in the first embodiment without detecting the homotopy class inherently held by a target content. Alternatively, the fourth embodiment may be applied to the second embodiment. If a digital watermark is embedded into a moving image without detecting the homotopy class inherently held by the target content in the second embodiment, it suffices that the digital watermark embedding section 1012 embedding a digital watermark into a still image embeds the watermark information into all the frames as in the case of the second embodiment. In that case, the maximum likelihood class calculating section 1023 can be dispensed with and the output value (homotopy class) of the digital watermark detecting section 1022 detecting the digital watermark from the still image may be applied to the homotopy class/watermark information transforming section 1024. The same thing is true if the fourth embodiment is applied to the third embodiment.

Fifth Embodiment

In the fourth embodiment, the same homotopy class is embedded to all the frames in the first, second or third embodiment. In the fifth embodiment, different homotopy classes (which may include a case where not less than two pixels having the same value exist) are embedded into respective frames in the first, second or third embodiment.

FIG. 27 shows a digital watermark embedding apparatus 1D according to the fifth embodiment. The digital watermark embedding apparatus 1D comprises a frame dividing section 2011, digital watermark embedding section 2012 embedding a digital watermark into a still image, frame composing section 2013, randomizing section 2014 and watermark information/homotopy class transforming section 2015.

The frame dividing section 2011, digital watermark embedding section 2102 embedding a digital watermark into a still image, watermark information/homotopy class transforming section 2015 and frame composing section 2013 are the same in configuration as the frame dividing section 1011, digital watermark embedding section 1012 embedding a digital watermark into a still image and frame composing section 1013 shown in FIG. 25 (fourth embodiment), respectively.

The randomizing section 2014 performs an operation for generating random numbers using predetermined key information (e.g., generate random numbers in different manners according to the key information) and thereby determining individual classes to be embedded into the respective frames so as not to select the same class but to select different classes to be embedded for the respective frames at random.

This operation is intended to make it more difficult to falsify watermark information by randomly embedding different classes into the respective frames. Namely, even if a person intending to falsify watermark information wants to embed a class corresponding to certain watermark information into each frame, the series of the classes cannot be accurately generated unless the person is aware of the key information and a random number generating method, thereby making falsification difficult.

FIG. 28 shows a digital watermark detecting apparatus 2D according to the fifth embodiment. The digital watermark detecting apparatus 2D, comprises a frame dividing section 2021, digital watermark detecting section 2022 detecting a digital watermark from a still image, inverse transforming section 2023 and homotopy class/watermark information transforming section 2024.

The frame dividing section 2021, digital watermark detecting section 2022 detecting a digital watermark from a still image and homotopy class/watermark information transforming section 2024 are the same in configuration as the frame dividing section 1021, digital watermark detecting section 1022 detecting a digital watermark from a still image and homotopy class/watermark information transforming section 1024 shown in FIG. 23 (fourth embodiment), respectively.

The inverse transforming section 2023 is opposite in input/output relations to the randomizing section 2014 (FIG. 27) of the digital watermark embedding apparatus 1D. The inverse transforming section 2023 performs a processing for obtaining the value of a class before randomization (value input into the randomizing section 2014) based on the value of the class detected for each frame. In the operation, the inverse transforming section 2023 obtains the value of the class before randomization by a method based on the same key information as that used by the randomizing section 2014. For example, the relationship between the value of the class detected for each frame and the value of the class before randomization differs according to the key information.

Various method for the processing performed by the inverse transforming section 2023 are considered. Among these methods, for example, if the randomizing section 2014 generates such pseudo-random numbers as to obtain an average value from the values of classes before randomization (or to have the highest appearance frequency thereof), the inverse transforming section 2023 obtains, for example, the average value or the value obtained with the highest frequency from the values of the classes obtained for the respective frames and outputs the average value as the maximum likelihood value as in the case of the maximum likelihood class calculating section 1023.

In the examples shown in FIGS. 27 and 28, the key information is employed. Alternatively, a method for fixing a processing content without using key information is applicable.

Further, the random numbers generated by the randomizing section 2014 of the digital watermark embedding apparatus are formed into a random number sequence employed for spectrum spread, and the inverse transforming section 2023 of the digital watermark detecting apparatus evaluates the correlation between the detected sequence and the random number sequence employed for embedding, thereby making it possible to provide a system strongly resisting various attacks and operations including a geometrical distortion.

To avoid an attack such as the sampling of frames, if a sequence subjected to error correction coding to provide an error correcting capability if the disappearance of frames occurs is embedded as a sequence indicating classes embedded into respective frames, the resistance of the system can be improved.

Sixth Embodiment

The sixth embodiment related to a modification of the fifth embodiment will be described hereinafter.

FIG. 29 shows a digital watermark embedding apparatus 1E according to the sixth embodiment. The digital watermark embedding apparatus 1E comprises a frame dividing section 2411, digital watermark embedding section 2412 embedding a digital watermark into a still image, frame composing section 2413, random number generating section 2414 and watermark information/random number seed transforming section 2415.

The frame dividing section 2411, digital watermark embedding section 2412 embedding a digital watermark into a still image, frame composing section 2413 are the same in configuration as the frame dividing section 2011, digital watermark embedding section 2012 embedding a digital watermark into a still image, frame composing section 2013 shown in FIG. 27, respectively.

The watermark information/random number seed transforming section 2415 is basically the same as the watermark information/homotopy class transforming section 2015 shown in FIG. 27. The watermark information/random seed transforming section 2415 outputs not a homotopy class corresponding to watermark information but a random number seed input into the random number generating section 2414 and corresponding to watermark information.

The random number generating section 2414 outputs a pseudo-random number sequence based on the random number seed input from the watermark information/random number seed transforming section 2415. This pseudo-random number sequence gives a sequence of homotopy classes to be set in the respective frames.

FIG. 30 shows a digital watermark detecting apparatus 2E according to the sixth embodiment. The digital watermark detecting apparatus 2E comprises a frame dividing section 2421, digital watermark detecting section 2422 detecting a digital watermark from a still image, correlation determining section 2423, random number seed/watermark information transforming section 2424, random number generating section 2434 and random number seed generating section 2435.

The frame dividing section 2421 and digital watermark detecting section 2422 detecting digital watermark from a still image are the same in configuration as the frame dividing section 2021 and digital watermark detecting section 2022 detecting digital watermark from a still image shown in FIG. 28, respectively.

The random number generating section 2434 is the same in configuration as the random number generating section 2414 shown in FIG. 29.

The random number seed generating section 2435 generates a random number seed probably output from the watermark information/random number seed transforming section 2415 shown in FIG. 29 or a random number seed probably employed when embedding a digital watermark into a target content.

The random number seed/watermark information transforming section 2424 is basically the same as the homotopy class/watermark information transforming section 2024 shown in FIG. 28. However, the random number seed/watermark information transforming section 2424 outputs not watermark information corresponding to a homotopy class but watermark information corresponding to a random number seed. That is, the random number seed/watermark information transforming section 2424 performs an inverse transformation to the transformation of the watermark information/random number seed transforming section 2015 shown in FIG. 29.

In the fourth embodiment shown in FIG. 28, the inverse transforming section 2023 estimates the maximum likelihood class based on the value of the classes obtained for the respective frames.

In the fifth embodiment shown in FIG. 30, by contrast, a random number seed is assumed in advance, a pseudo-random number sequence (sequence of the values of homotopy classes) generated based on the random number seed is compared with a pseudo-random number sequence (sequence of the values of homotopy classes) detected from a target content. If the both sequences are determined to be the same, it is then determined that watermark information corresponding to the random number seed assumed in advance.

First, the random number seed generating section 2435 outputs a certain random number seed.

The random number generating section 2414 generates a pseudo-random number sequence (sequence of the values of homotopy classes) based on the random number seed input from the random number seed generating section 2435.

The correlation determining section 2423 calculates the correlation between a sequence of homotopy classes corresponding to the respective frames from the random number generating section 2434 and a sequence of homotopy classes corresponding to the respective frames from the digital watermark detecting section 2422. If it is determined that the both sequences are not the same, the correlation determining section 2423 applies a determination result indicating inconsistence to the random number seed generating section 2435.

If applied with the determination result indicating inconsistence from the correlation determining section 2423, the random number seed generating section 2435 outputs another random number seed. Then, as in the case of the above, the random number generating section 2434 generates a pseudo-random number sequence. In addition, as in the case of the above, the correlation determining section 2423 calculates a correlation. If the both sequences are determined to be different, the correlation determining section 2423 applies again a determination result indicating inconsistence to the random number seed generating section 2435.

After repeating a series of processings stated above, the correlation determining section 2423 calculates the correlation between the homotopy class sequence from the random number generating section 2434 and the homotopy class sequence from the digital watermark embedding section 2422. If the both sequences are determined to be the same, the correlation determining section 2423 applies a determination result indicating consistence to the random number seed generating section 2435.

If applied with the determination result indicating consistence from the correlation determining section 2423, the random number seed generating section 2435 outputs the random number seed at this time to the random number seed/watermark information transforming section 2424.

The random number seed/watermark information transforming section 2424 applied with the random number seed from the random number seed generating section 2435 obtains and outputs watermark information corresponding to the random number seed thus applied.

If a correlation determination result indicating consistence is not eventually obtained, it indicates a state in which no watermark information is embedded into the target content.

The correlation calculation of the correlation determining section 2423 is performed by accumulating a value of 1 to the element for which the values of, for example, two sequences are coincident with each other and a value 0 to the element for which the values of the two sequences are not coincident. Then, if this accumulated value exceeds a predetermined threshold value, for example, a determination result indicating consistence is output and if not exceed the predetermined threshold value, a determination result indicating inconsistence is output.

To be specific, it is assumed that copy approval or copy prohibition is embedded, as watermark information, into a content.

It is also assumed that the random number seed corresponding to copy approval is a binary number x of a predetermined bits and that corresponding to copy prohibition is a binary number y ($\neq$x) of a predetermined bit.

It is further assumed that the copying of a detection target content is approved, and that homotopy classes 0, 1, 0, 0, 1, 1, 0, 1, 0, 1, 1, 1, 0, . . . generated with the binary number x of the predetermined bit set as a random number seed are set to the respective frames of the content.

When detecting watermark information, the random number seed generating section 2435 first outputs, for example, a random number seed y corresponding to copy prohibition.

The random number generating section 2414 generates a sequence of homotopy classes corresponding to the respective frames based on the random number seed y input thereinto from the random number seed generating section 2435. It is assumed, for example, the following homotopy class sequence is generated:

1, 1, 0, 1, 0, 1, 1, 1, 0, 0, 1, 1, 0, . . . .

On the other hand, the digital watermark detecting section 2422 outputs a sequence of homotopy classes corresponding to the respective frames as follows:

0, 1, 0, 0, 1, 1, 0, 1, 0, 1, 1, 1, 0, . . . .

The correlation determining section 2423 calculates the correlation between a sequence of homotopy classes corresponding to the respective frames from the random number generating section 2434 and a sequence of homotopy classes corresponding to the respective frames from the digital watermark detecting section 2422. In this case, the correlation calculation result does not satisfy a consistence condition, the both sequences are determined to be different and a determination result indicating inconsistence is input to the random number seed generating section 2435.

Next, the random number seed generating section 2435 outputs a random number seed x corresponding to copy approval.

The random number generating section 2434 generates a sequence of homotopy classes corresponding to the respective frames based on the random number seed x input from the random number seed generating section 2435 as follows:

0, 1, 0, 0, 1, 1, 0, 1, 0, 1, 1, 1, 0, . . . .

On the other hand, the digital watermark detecting section 2422 outputs a sequence of homotopy classes corresponding to the respective frames as follows:

0, 1, 0, 0, 1, 1, 0, 1, 0, 1, 1, 1, 0, . . . .

The correlation determining section 2423 calculates the correlation between the sequence of homotopy classes corresponding to the respective frames from the random number generating section 2434 and the sequence of homotopy classes corresponding to the respective frames from the digital watermark detecting section 2422. In this case, since the correlation calculation result satisfies the consistence condition, the both sequences are determined to be the same and a determination result indicating consistence is output to the random number seed generating section 2435.

If applied with the determination result indicating consistence from the correlation determining section 2423, the random number seed generating section 2435 outputs the random number seed x at this time to the random number seed/watermark information transforming section 2424.

The random number seed/watermark information transforming section 2424 applied with the random number seed x from the random number seed generating section 2435 outputs watermark information corresponding to the random number seed x applied, i.e., information indicating copy approval.

It is noted that the random number sequence generated by the random number seed generating section 2435 may not necessarily include respective elements each having a value of 0 or 1 but may include the respective elements having integer values.

Various methods with which the random number seed generating section 2435 generates a random seed are considered.

Meanwhile, in the above description, the random number seed generating section 2435 assumes a random number seed and does trial and error for the assumed random number seed according to the correlation determination result. Alternatively, the random number seed generating section 2435 can assume watermark information and do trial and error for the assumed watermark information according to the correlation determination result.

In this case, instead of the random number seed generating section and the random number seed/the watermark information transforming section, the watermark information generating section and the watermark information/random number seed transforming section are provided.

The watermark information generating section outputs certain watermark information.

The watermark information/random number seed transforming section outputs a random number seed corresponding to the watermark information applied from the watermark information generating section.

The random number generating section 2434 generates a pseudo-random number sequence (a sequence of homotopy classes corresponding to the respective frames) based on the random number seed input from the watermark information/random number seed transforming section.

The correlation determining section 2423 calculates the correlation between the sequence of homotopy classes corresponding to the respective frames from the random number generating section 2434 and the sequence of homotopy classes corresponding to the respective frames from the digital watermark detecting section 2422. If determining that the both sequences are different, the correlation determining section 2423 outputs a determination result indicating inconsistence to the watermark information generating section.

If the determination result indicating inconsistence is input to the watermark information generating section from the correlation determining section 2423, the watermark information generating section outputs another watermark information. Then, as in the case of the above, the random number generating section 2434 generates a pseudo-random number sequence. Likewise, if the correlation determining section 2423 calculates a correlation and determines that the both sequences are different, then the correlation determining section 2423 applies a determination result indicating inconsistence again to the watermark information generating section.

After a series of the above-stated processings, the correlation determining section 2423 calculates the correlation between the homotopy class sequence from the random number generating section 2434 and the homotopy class correlation from the digital watermark information detecting section 2422. If determining that the both sequences are the same, the correlation determining section 2423 applies a determination result indicating consistence to the watermark information generating section this time.

If applied with the determination result indicating consistence from the correlation determining section 2423, the watermark information generating section outputs the watermark information at that time.

Various methods with which the watermark information generating section generates watermark information are considered.

Now, a variation common to all of or some of the embodiments stated above will be described in detail.

In the embodiments stated so far, description has been given while assuming that the base space is $S^2$ and the target space is $S^2$. Alternatively, the other spaces such as a base space and a target space each having a nontrivial topology may be adopted.

For example, the upper end and the lower end of an image are identified with each other and the right end and the left end thereof are identified with each other, making it possible to set a base space as a torus $T^2$.

Next, variations of the function representing an embedded image will be described.

A function representing an embedded image is set so that the change of the function in the vicinity of the periphery of the image is gentler and that the function has values gradually closer to a certain value at positions closer to the periphery. By doing so, if a part of the image in the vicinity of the center of the image is cut, the lost peripheral portion has a smaller influence on an integral value. Accordingly, if an image or a content has an important content concentrated in the vicinity of the center thereof (it is considered that there are many contents of this type), it is possible to realize resistance against the cutting to some extent. Normally, even if only the important part is cut, it is possible to leave the digital watermark by setting the function is set so as to have large change on the important part of the image.

Next, variations to the processing for a moving image will be described.

In the embodiments stated so far, a processing is basically performed for each frame of a moving image. There are also other modified, expanded embodiments for the moving image. For example, there is an embodiment of embedding a watermark employing a homotopy group represented by $\pi_3(S^2)=Z$ while assuming that a base space is a three-dimensional spherical surface and a target space is a two-dimensional spherical surface.

That is to say, each of the frames or fields (rectangles shown in FIG. 31A) of the moving image can be identified with a two-dimensional spherical surface $S^2$ as in the case of the still image. A plurality of two-dimensional spherical surfaces $S^2$ corresponding to the plural frames or fields existing in a certain time period exist (respective spherical surfaces shown in FIG. 31B). If these plural two-dimensional spherical surfaces are stacked according to the order of time, it is possible to constitute a three-dimensional spherical surface (FIG. 31C).

It is assumed here that each of the two-dimensional spherical surfaces having a start point and an end point, respectively, is contracted into one point (FIG. 31D).

By setting the three-dimensional spherical surface thus constituted as a base space, the elements of the homotopy group $\pi_3(S^2)=Z$ can be utilized to express watermark information.

Figure 32A:
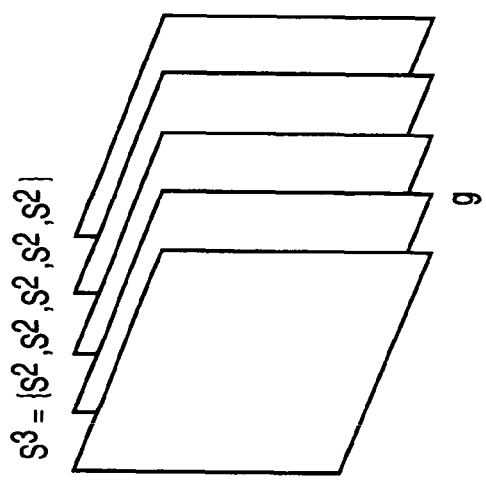
FIGS. 32A and 32B are explanatory views for yet another moving image processing method.
Figure 32B:
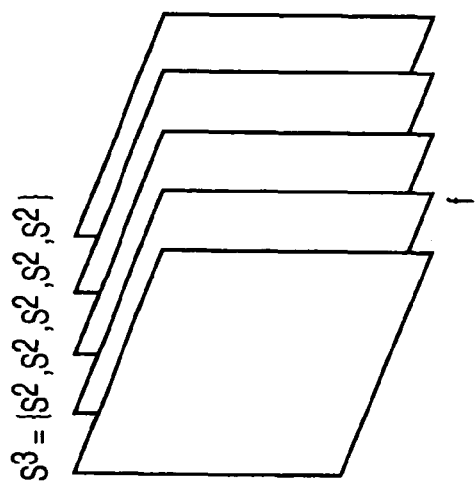
Figure 32B:
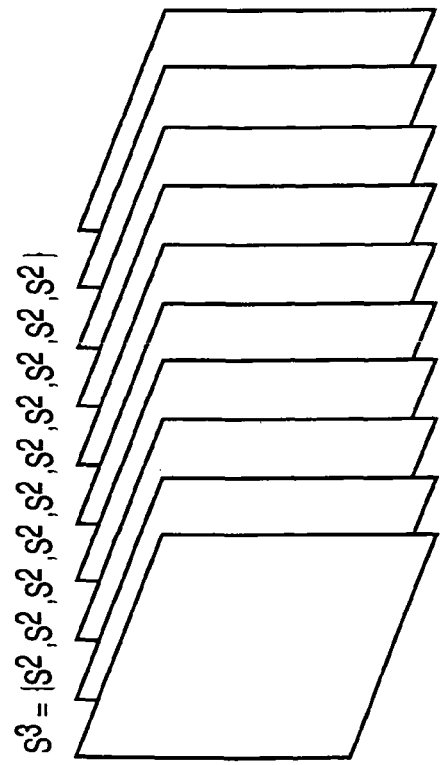

In this case, as in the case of the above, if a certain moving image has a representative value expressed by a function f in a predetermined number of continuous frames (FIG. 32A), an embedding function g is embedded into a plurality of frames following the predetermined number of continuous frames (FIG. 32A), thereby making it possible to change the moving image so as to have an element of a desired homotopy group (FIG. 32B). In this case, as in the case of the still image (first embodiment), a processing is performed so that the function f becomes a function on a plurality of frames which are half as many as a predetermined number of frames and a function obtained by composing the function f with an embedding function defined on the remaining half the number of frames. By doing so, the element of the homotopy group in the predetermined number of plural frames can be set at a desired value.

Needless to say, as in the case of the still image (second embodiment), the representative value of an original image may be replaced by the value of the embedding function corresponding to the element of a desired homotopy group.

Next, variations to the processing for voice data will be described.

Description has been given so far while taking a case of using a still image or a moving image as a target content, as an example. It goes without saying that the present invention is also applicable to the other media and digital contents. As one example of the modifications, description will be given to a case of using a digital content such as a voice or music as a target content.

As shown in FIG. 33, voice data is expressed as data obtained by sampling the vibration of a medium (e.g., the air) propagating sound at a plurality of time points. That is, the voice data expresses the displacement of this vibration as a time function.

Now, a certain time period is set as a base space. In this period, by identifying a start point with an end point, the base space can be identified with a one-dimensional spherical surface $S^1$. If the vibration at a plurality of sample points in the time period is expressed by multiple bits with respect to data indicating the vibration, two bit region are set from an intermediate bit plane among these multiple bits (FIG. 34A). A space formed by these bit regions corresponds to a color space in case of an image (FIGS. 34B and 34C). The range of these regions is selected so that even if values are rewritten, the influence of the rewritten values is hardly audible to human ears and that embedded information is not lost by a compression operation or the like.

In this two-dimensional space, a one-dimensional spherical surface (circle) is set as a target space. By do setting, the element of a homotopy class $\pi_1(S^1)$ relating to a mapping from a one-dimensional spherical surface to a one-dimensional spherical surface can be utilized to express watermark information. A digital watermark embedding apparatus and a digital watermark detecting apparatus can be realized by providing the same configurations as those in case of a picture.

Also, as another example of selecting a target space, three frequency bands are selected as a target space, the LSB (least significant bit) of each frequency band is selected and a two-dimensional torus $T^2$ is set in these selected LSB's (FIGS. 35A, 35B and 35C). In this case, the element of a homotopy group $\pi_2(T^2)=Z\times Z$ can be utilized to express watermark information.

Furthermore, another method for setting a target space will be described. Voice data include data formed of multichannel (e.g., stereo voice data formed of two channels, i.e., right and left channels). In case of such data, a bit region is set for each channel and a target region can be constituted of the bit regions.

In these examples, it is possible to realize a robustness against an operation for extending or contracting a time axis, as shown in FIG. 36, as an operation corresponding to a geometrical distortion in case of an image.

Next, variations to the topological invariant will be described.

In the embodiments stated so far, description has been given to a case where the homotopy class is employed as a topological invariant. It is also possible to employ topological invariants other than the homotopy class.

Many topological invariants other than the element of a homotopy group, which are exemplified by a homology group, cohomology group, characteristic class such as a Stiefel-Whitney class, a Chern class and a Pontryagin class for a vector bundle, Euler numbers for a polyhedron, an index, a signature, the Alexander topological invariant relating to a knot and the Milnor topological invariant relating to a tangled thread (see, for example, Iwanami Sugaku Jiten (Iwanami's Mathematical Dictionary), 3rd edn. The Mathematical Society of Japan, Iwanami Shoten, Publishers). These other topological invariants can be utilized.

While the integral quantity given by, for example, the Gauss-Bonnet theorem is utilized for the homotopy group. In case of characteristic classes such as the Chern class, integral quantities given by, for example, the Atiyah-Singer exponential theorem can be utilized. In the latter case, the integral quantities exemplified for the homotopy group may be replaced by integral quantities deriving these topological invariants.

Now, a hardware configuration and a software configuration in this embodiment will be described.

The digital watermark embedding apparatus in this embodiment can be realized as either a hardware or a software, i.e., program for allowing a computer to execute predetermined means, to function as predetermined means or to realize predetermined functions. If the digital watermark embedding apparatus is realized by a software, the program can be transmitted and received to and from a recording medium or a communication medium. The same thing is true for the digital watermark detecting apparatus.

If the digital watermark embedding apparatus and the digital watermark detecting apparatus are realized as hardware, they can be constituted as semiconductor devices, respectively.

If the digital watermark embedding apparatus to which the present invention is applied is constituted or a digital watermark embedding program is created, blocks or modules having the same configuration can be individually created. It is also possible to prepare only one or an appropriate number of blocks or modules having the same configuration and to share the blocks or modules among the respective parts of the algorithm. The same thing is true if the digital watermark detecting apparatus is constituted or a digital watermark detecting program is created. Further, if a system including the digital watermark embedding apparatus and a digital watermark detecting apparatus is constituted or a system including the digital watermark embedding program and the digital watermark detecting program is created, it is possible to prepare only one or an appropriate number of blocks or modules having the same configuration over the digital watermark embedding apparatus or program and the digital watermark detecting apparatus or program and to share the blocks or modules among the respective parts of the algorithm.

Furthermore, if the digital watermark embedding apparatus and the digital watermark detecting apparatus comprise software, it is possible to perform parallel processings using a multiprocessor and to thereby accelerate processings.

The configurations exemplified in this embodiment are provided only for illustrative purposes and not intended to exclude the other configurations. A part of the exemplified configurations can be replaced by the others or can be omitted, other functions can be added to the exemplified configurations, and other configurations obtained by a combination thereof can be utilized. In addition, other configurations logically equivalent to the exemplified configurations, other configurations including a part logically equivalent to the exemplified configurations, other configurations logically equivalent to the important parts of the exemplified configurations and the like can be utilized. Also, other configurations for attaining the same or similar objects as those of the exemplified configurations, other configurations having the same or similar advantages as those of the exemplified configurations and the like can be utilized.

The diverse variations to the respective constituent elements can be executed by appropriately combining them.

Moreover, the embodiments of the present invention contain and include inventions relating to various viewpoints, stages, concepts or categories such as an invention as an individual apparatus, an invention as an entire system, an invention relating to the internal constituent elements of the individual apparatus and method inventions corresponding thereto.

Accordingly, the invention can be extracted from the content disclosed in the embodiments of the present invention without limiting the invention to the exemplified configurations.

The present invention should not be limited to the above-stated embodiments and various changes and modifications can be made within the technical scope of the invention.

According to the present invention, the topological invariant corresponding to the watermark information to be embedded is set to the target content. Therefore, even if the target content receives a local distortion such as a StirMark attack or D-A-D conversion on the distribution path, the topological invariant set to the target content is maintained and held. Further, it is possible to detect a topological invariant from the content and to obtain watermark information corresponding to the detected topological invariant irrespectively of whether or not the content is locally distorted.

Moreover, in the embodiments for writing data expressing a topological invariant so that the change of the bit string of the content is as small as possible, it is possible to prevent the content from being influenced by the topological invariant as much as possible.

What is claimed is:

1. A watermark embedding apparatus, comprising:
a processor comprising:
a homotopy class calculating unit configured to calculate a homotopy class of an input image to be watermarked;
a watermark information class transforming unit configured to calculate a homotopy class of watermark information; and
a homotopy class changing unit configured to change at least a portion of the input image based on a topological invariant, wherein the topological invariant is maintained when a local distortion which is a homeomorphism is applied to a topological space formed of a set of points of the input image, the local distortion including a Stirmark attack, the topological invariant corresponding to watermark information to be embedded into the input image, and the local distortion being expressed by functions, each of the functions depending on a position of the points;
wherein the homotopy class changing unit is further configured to change said at least said portion of the input image so that the homotopy class of the input image corresponds to the homotopy class of the watermark information.

2. The apparatus according to claim 1, wherein the topological invariant is a homotopy invariant.

3. The apparatus according to claim 2, wherein said changing unit is further configured to change a predetermined part of a bit string corresponding to a spatial or time-basis position of the input image to a target value determined by the position of the bit string and the topological invariant or a target restorable value.

4. The apparatus according to claim 3, wherein said changing unit is further configured to generate a mapping to a target topological space defined by the predetermined part of said bit string from a base topological space defined by the spatial or time-basis position, and obtain the target value corresponding to the position based on a function for applying the topological invariant.

5. The apparatus according to claim 4, wherein the function has the topological invariant as a parameter.

6. The apparatus according to claim 3, wherein the target restorable value is a value obtained by scaling the target value, and
the changing unit is further configured to select a scale power for scaling the target value so as to decrease the influence on the input image for the target value corresponding to the position.

7. The apparatus according to claim 4, wherein the changing unit is further configured to evaluate an influence on the input image if the topological invariant is set to the input image using a plurality of different functions, and to use a function evaluated to minimize the influence on the input image as the function for applying the topological invariant.

8. The apparatus according to claim 2, wherein said changing unit is further configured to set a value, allowing a representative value representing a divided region which is obtained by dividing the input image in a spatial manner or a time-basis manner and obtained from a predetermined part of one or a plurality of bit strings corresponding to a spatial or time-basis position of the divided region to become a target value determined by the spatial or time-basis position of the divided region and the topological invariant or a target restorable value, to the predetermined part of the one or the plurality of bit strings.

9. The apparatus according to claim 8, wherein the bit string corresponding to the plurality of positions enables configuring a content of one divided region, and the representative value is an average value of values of the predetermined parts of the plurality of bit strings.

10. The apparatus according to claim 2, wherein the input image into which the watermark information is to be embedded is a content dividable into a plurality subcontents, and the topological invariant corresponding to the watermark information is set to the plurality of sub-contents.

11. The apparatus according to claim 2, wherein the input image into which the watermark information is to be embedded is a content dividable into a plurality subcontents, and a value according to a pseudo-random number generated based on the watermark information is set, as the topological invariant, to the plurality of sub-contents.

12. The apparatus according to claim 2, wherein the topological invariant comprises watermark information to be embedded into the input image such that the watermark is not lost.

13. A watermark detecting apparatus, comprising:
a processor comprising:
a homotopy class calculating unit configured to calculate a homotopy class of a watermarked image; and
a detector configured to detect watermark information by obtaining a topological invariant, wherein the watermarked image comprises points, the topological invariant is maintained when a local distortion which is a homeomorphism is applied to a topological space formed of a set of points of the watermarked image, the local distortion including a Stirmark attack, the local distortion being expressed by functions, each of the functions depending on a position of the points;
wherein the detector is further configured to obtain watermark information corresponding to the calculated homotopy class.

14. The apparatus according to claim 13, wherein the topological invariant is a homotopy invariant.

15. The apparatus according to claim 14, wherein said detector is further configured to obtain a representative value representing a divided region obtained by dividing the watermarked image in a spatial manner or a time-basis manner based on a value read from a predetermined part of one or a plurality of bit strings corresponding to a spatial or time-basis position of the divided region, and obtain the topological invariant based on the representative value representing the divided region.

16. The apparatus according to claim 15, wherein a plurality of positions are provided, a watermarked image of one divided region is constituted by the bit string corresponding to the plurality of positions, and the representative value is an average value of values of the predetermined part of the plurality of bit strings.

17. The apparatus according to claim 15, wherein said detector is further configured to obtain a target value normalizing the representative value of the divided region, and perform a predetermined summing arithmetic operation for the target value and a difference in target values, thereby obtaining the topological invariant.

18. The apparatus according to claim 14, wherein
the watermarked image into which the watermark information is to be embedded is a content dividable into a plurality of sub-contents, topological invariants are detected from the plurality of sub-contents, respectively, and the watermark information is obtained based on the obtained topological invariants.

19. The apparatus according to claim 14, wherein
the watermarked image is image data of a still image or moving image frames, and
the part is a pixel value vector of the image data.

20. The apparatus according to claim 14, wherein
the watermarked image is moving image data, and
the part is a pixel value vector of the moving image data.

21. The apparatus according to claim 14, wherein
the watermarked image is voice data, and
the part is an amplitude value vector of the voice data.

22. The apparatus according to claim 13, wherein the topological invariant comprises watermark information to be embedded into the watermarked image such that the watermark is not lost.

23. A non-transitory computer readable medium having computer executable instructions, which when executed by a computer, cause the computer to perform a method comprising:
calculating a homotopy class of a watermarked image
detecting watermark information of the watermarked image by obtaining a topological invariant, wherein the watermarked image comprises points, the topological invariant is maintained when a local distortion which is a homeomorphism is applied to a topological space formed of a set of points of the watermarked image, the local distortion including a Stirmark attack, the local distortion being expressed by functions, each of the functions depending on a position of the points; and
obtaining watermark information corresponding to the calculated homotopy class.

24. The medium according to claim 23, wherein the topological invariant comprises watermark information to be embedded into the watermarked image such that the watermark is not lost.

25. The medium according to claim 23, wherein the toplogical invariant is a homotopy invariant.

26. A watermark embedding apparatus, comprising:
a processor comprising:
a watermark information class transforming unit configured to calculate a homotopy class of watermark information; and
a homotopy class changing unit configured to generate an embedding function corresponding to an element of the homotopy class of the watermark information and to change at least a portion of an input image based on a topological invariant, wherein the topological invariant is maintained when a local distortion which is a homeomorphism is applied to a topological space formed of a set of points of the input image, the local distortion including a Stirmark attack, the topological invariant corresponding to the embedding function and the local distortion being expressed by functions, each of the functions depending on a position of the points;
wherein the homotopy class changing unit is further configured to change said at least said portion of the input image so that the homotopy class of the input image corresponds to the homotopy class of the watermark information.

27. A watermark embedding apparatus, comprising:
a processor comprising:
a frame dividing unit configured to divide a moving image into frames;
a watermark information class transforming unit configured to calculate a homotopy class of watermark information;
a homotopy class changing unit configured to change at least a portion of each of the frames based on a topological invariant, wherein the topological invariant is maintained when a local distortion which is a homeomorphism is applied to a topological space formed of a set of points of a frame, the local distortion including a Stirmark attack, the topological invariant corresponding to watermark information to be embedded into moving image data, and the local distortion being expressed by functions, each of the functions depending on a position of the points; and
a frame composing unit configured to compose the frames having a portion which is changed into the moving image data;
wherein the homotopy class changing unit is further configured to change said at least said portion of each of the frames so that the homotopy class of the frames corresponds to the homotopy class of the watermark information.

28. A watermark detecting apparatus, comprising:
a processor comprising:
a frame dividing unit configured to divide a moving image into frames; and
a detector configured to detect watermark information by obtaining a topological invariant, wherein the frame comprises points, the topological invariant is maintained when a local distortion which is a homeomorphism is applied to a topological space formed of a set of points of the frame, the local distortion including a Stirmark attack, the local distortion being expressed by functions, each of the functions depending on a position of the points;
wherein the detector is further configured to obtain watermark information corresponding to a calculated homotopy class.

29. A non-transitory computer readable medium having computer executable instructions, which when executed by a computer, cause the computer to perform a method comprising:
dividing a watermarked moving image into frames;
detecting watermark information of the watermarked image by obtaining a topological invariant, wherein the frame comprises points, the topological invariant is maintained when a local distortion which is a homeomorphism is applied to a topological space formed of a set of points of the frame, the local distortion including a Stirmark attack, the local distortion being expressed by functions, each of the functions depending on a position of the points; and
obtaining watermark information corresponding to a calculated homotopy class.

* * * * *